(12) United States Patent
Mizutani et al.

(10) Patent No.: US 7,505,893 B2
(45) Date of Patent: Mar. 17, 2009

(54) DIALOGUE SUPPORTING APPARATUS

(75) Inventors: Kenji Mizutani, Nara (JP); Yoshiyuki Okimoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 195 days.

(21) Appl. No.: 11/785,700

(22) Filed: Apr. 19, 2007

(65) Prior Publication Data

US 2007/0192110 A1 Aug. 16, 2007

Related U.S. Application Data

(63) Continuation of application No. PCT/JP2006/022129, filed on Nov. 7, 2006.

(30) Foreign Application Priority Data

Nov. 11, 2005 (JP) ............................. 2005-328096

(51) Int. Cl.
 *G10L 15/00* (2006.01)
(52) U.S. Cl. ............................. 704/2; 704/8; 704/251; 704/257
(58) Field of Classification Search ............... 704/2, 704/8, 251, 257
See application file for complete search history.

(56) References Cited

U.S. PATENT DOCUMENTS

| 5,289,375 | A | * | 2/1994 | Fukumochi et al. | ............ 704/2 |
| 7,194,403 | B2 | * | 3/2007 | Okura et al. | ............ 704/7 |
| 2002/0138250 | A1 | * | 9/2002 | Okura et al. | ............ 704/2 |
| 2007/0239669 | A1 | * | 10/2007 | Ordonez et al. | ............ 707/2 |

FOREIGN PATENT DOCUMENTS

| JP | 63-109574 | 5/1988 |
| JP | 11-272671 | 10/1999 |
| JP | 2004-102946 | 4/2004 |

OTHER PUBLICATIONS

Y. Akiba et al., "Overview of the IWSLT04 Evaluation Campaign", International Workshop on Spoken Language Translation (Interspeech2004-ICSLPSatellite Workshop), 2004.

* cited by examiner

*Primary Examiner*—Daniel D Abebe
(74) *Attorney, Agent, or Firm*—Wenderoth, Lind & Ponack L.L.P.

(57) ABSTRACT

A dialogue supporting apparatus is provided which carries out a trade-off between the speed of the translation process and the fluency of the translation result, in accordance with the contents of a dialogue. The dialogue supporting apparatus includes a first input accepting unit 101 which accepts an utterance of a user 1 in a first language, a first translation processing unit 102 which translates the accepted utterance into a predetermined second language so as to output first translated utterance information, a first output unit 103 which conveys the first translated utterance information to a user 2, a second input accepting unit 104 which accepts an utterance of the user 2, a second translation processing unit 105 which translates the accepted utterance of the user 2 into the first language so as to output second translated utterance information, a second output unit 106 which conveys the second translated utterance information to the user 1, an output time determination unit which analyzes a characteristic included in the utterance of the user 1 and determines the upper limit for the translation time for an utterance to be accepted following the utterance of the first user. The second translation processing unit 105 outputs second translated utterance information acquired within such translation time.

16 Claims, 33 Drawing Sheets

FIG. 1

| Translation Algorithm | | Sentence length | | |
|---|---|---|---|---|
| | | 6 | 8 | 10 |
| Japanese to English | BS | 62 | 478 | 1432 |
| | PD | 47 | 1407 | >4000 |
| English to Japanese | BS | 40 | 235 | 1192 |
| | PD | 52 | 1059 | >3000 |

BS : Beam search algorithm
PD : Phrase decoding algorithm

FIG. 9

| Parameter | ⌀T[s] | T[s] | min T[s] | CPU performance [MIPS] |
|---|---|---|---|---|
| Reference value | 20 | 50 | 10 | 600 |
| Hardware performance of apparatus | 10 | 25 | 5 | 1200 |

FIG. 10

| Characteristic type | No. | Characteristic (Language 1) | Characteristic (Language 2) | Coefficient α |
|---|---|---|---|---|
| Mutual understanding | 1 | わかります | all right | -1 |
| | 2 | もちろん | of course | -1 |
| | 3 | わかります | i see | -1 |
| | 4 | はい | yes | -1 |
| | 5 | いいでしょう | ok | -1 |
| | 6 | その通りです | you're right | -1 |
| | 7 | 言うまでもない | not to mention | -1 |
| | 8 | 知っての通り | as you know | -1 |
| Continuity of surface expressions | 1 | *か*かどちら* | which *,* or * | -1 |
| | 2 | どこ* | where * | 1 |
| | 3 | *何* | what * | 1 |
| Change of topic | 1 | ところで | by the way | reset |
| | 2 | とにかく | anyway | reset |
| | 3 | 話は変わりますが | another topic | reset |
| | 4 | かしこまりました | certainly | reset |
| | 5 | それでは | so | reset |

FIG. 11

| Utterance order | Speaker | Utterance information | Translated utterance information/ likelihood | Operation of time calculation unit 204 |
|---|---|---|---|---|
| (Initialization) | | | | t=T |
| | | | | |
| | | | | |
| | | | | |
| | | | | |

701 spans Utterance order, Speaker, Utterance information; 702 = Translated utterance information/likelihood; 703 = Operation of time calculation unit 204.

FIG. 13

|  | 901 | | 902 | 903 |
|---|---|---|---|---|
| Utterance order | Speaker | Utterance information | Translated utterance information/ likelihood | Operation of time calculation unit 204 |
| (Initialization) | | | | t=T |
| 1 | User 1 | こんにちは(hello) | hello/1.0 | t=T |
| | | | | |
| | | | | |
| | | | | |

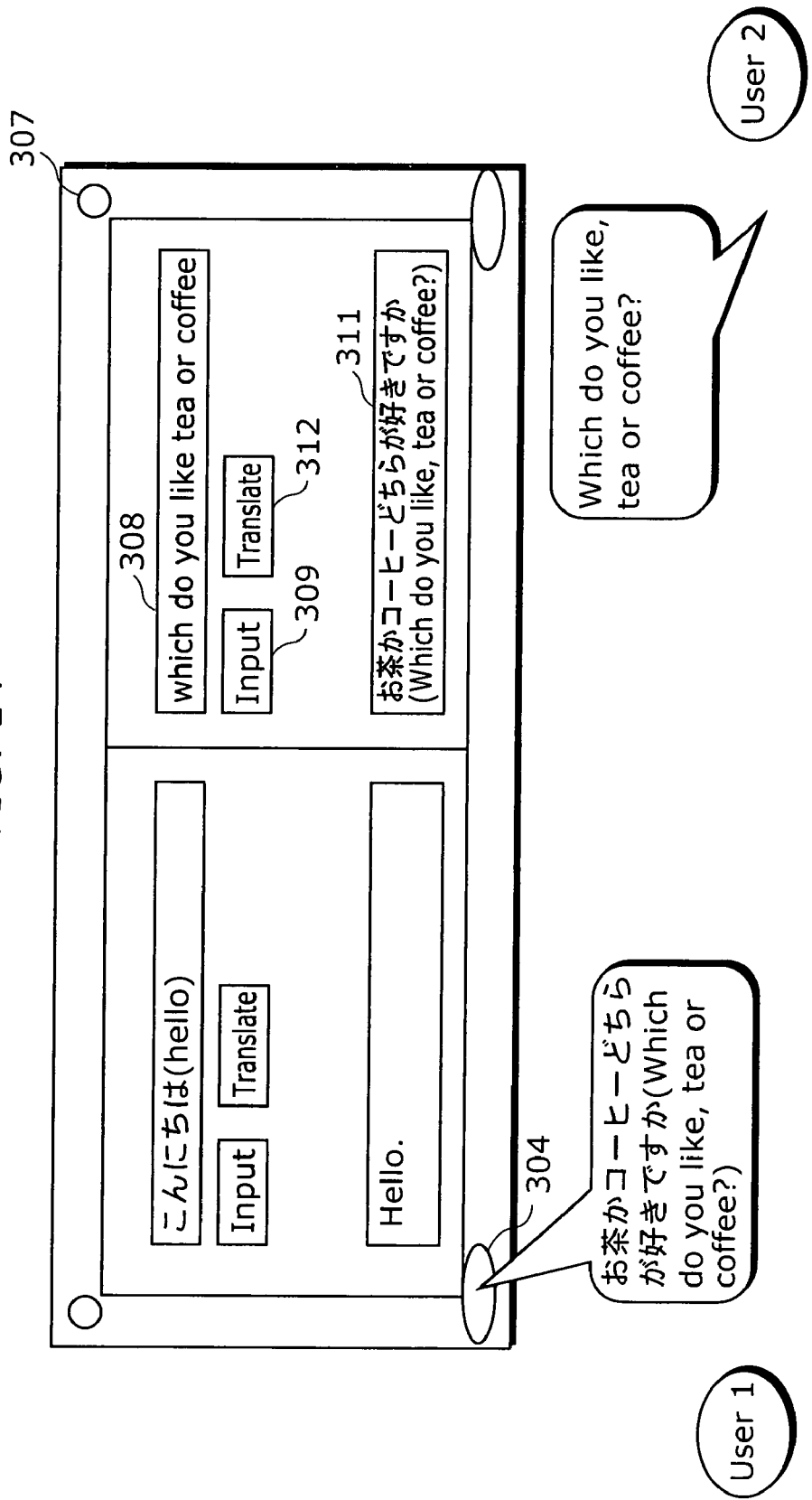

FIG. 15

| Utterance order | Speaker | Utterance information | Translated utterance information/ likelihood | Operation of time calculation unit 204 |
|---|---|---|---|---|
| (Initialization) | | | | t=T |
| 1 | User 1 | こんにちは(hello) | hello/1.0 | t=T |
| 2 | User 2 | which do you like tea or coffee | お茶かコーヒーどちらが好きですか(Which do you like, tea or coffee?)/0.9 | t=T-ΔT |
| | | | | |
| | | | | |

1101 (spans Utterance order, Speaker, Utterance information)
1102 (Translated utterance information/likelihood)
1103 (Operation of time calculation unit 204)

FIG. 17

| Utterance order | Speaker | Utterance information | Translated utterance information/ likelihood | Operation of time calculation unit 204 |
|---|---|---|---|---|
| (Initialization) | | | | t=T |
| 1 | User 1 | こんにちは(hello) | hello/1.0 | t=T |
| 2 | User 2 | Which do you like, tea or coffee | お茶かコーヒーどちらが好きですか(Which do you like, tea or coffee?)/0.9 | t=T-ΔT |
| 3 | User 1 | コーヒーがいいです (I would like to have coffee) | coffee good would/0.5 | t=T-ΔT |
| | | | | |

1301 spans Utterance order, Speaker, Utterance information. 1302 = Translated utterance information/likelihood. 1303 = Operation of time calculation unit 204.

FIG. 18A — 1402

| Utterance order | Speaker | Utterance information | Translated utterance information/likelihood | Operation of time calculation unit 204 |
|---|---|---|---|---|
| (Initialization) | | | | t=T |
| 1 | User 1 | こんにちは(hello) | hello/1.0 | t=T |
| 2 | User 2 | which do you like tea or coffee | お茶かコーヒーどちらが好きですか (Which do you like, tea or coffee)/0.9 | t=T-ΔT |
| 3 | User 1 | もちろんコーヒーがいいです(Of course I would like to have coffee) | of course coffee good would/0.5 | t=T-2ΔT |
| 4 | User 2 | certainly | かしこまりました(Certainly)/1.0 | t=T |
| 5 | User 1 | ついでに甘いものはありますか(In addition, do you have anything sweet) | in addition to something sweet is there /0.7 | t=T |
| 6 | User 2 | pardon | 何ですか(Pardon)/1.0 | t=T+ΔT |
| 7 | User 1 | ついでに甘いものはありますか(In addition, do you have anything sweet) | do you have anything sweet /0.9 | t=T |
| 8 | User 2 | we have cake and cookie | ケーキとクッキーがあります (We have cake and cookie)/0.9 | |

Translation processing time total: 8T-2ΔT

FIG. 18B — 1401

| Utterance order | Speaker | Utterance information | Operation of time calculation unit 204 |
|---|---|---|---|
| (Initialization) | | | |
| 1 | User 1 | (hello) | hello/1.0 |
| 2 | User 2 | which do you like tea or coffee | お茶かコーヒーどちらが好きですか (Which do you like, tea or coffee)/0.9 |
| 3 | User 1 | もちろんコーヒーがいいです(Of course I would like to have coffee) | of course coffee i would like to have coffee/0.9 |
| 4 | User 2 | certainly | かしこまりました(Certainly)/1.0 |
| 5 | User 1 | ついでに甘いものはありますか(In addition, do you have anything sweet) | in addition to somthing sweet is there /0.7 |
| 6 | User 2 | pardon | 何ですか(Pardon)/1.0 |
| 7 | User 1 | ついでに甘いものはありますか(In addition, do you have anything sweet) | in addition to somthing sweet is there /0.7 |
| 8 | User 2 | pardon | 何ですか(Pardon)/1.0 |

Translation processing time total: 8T

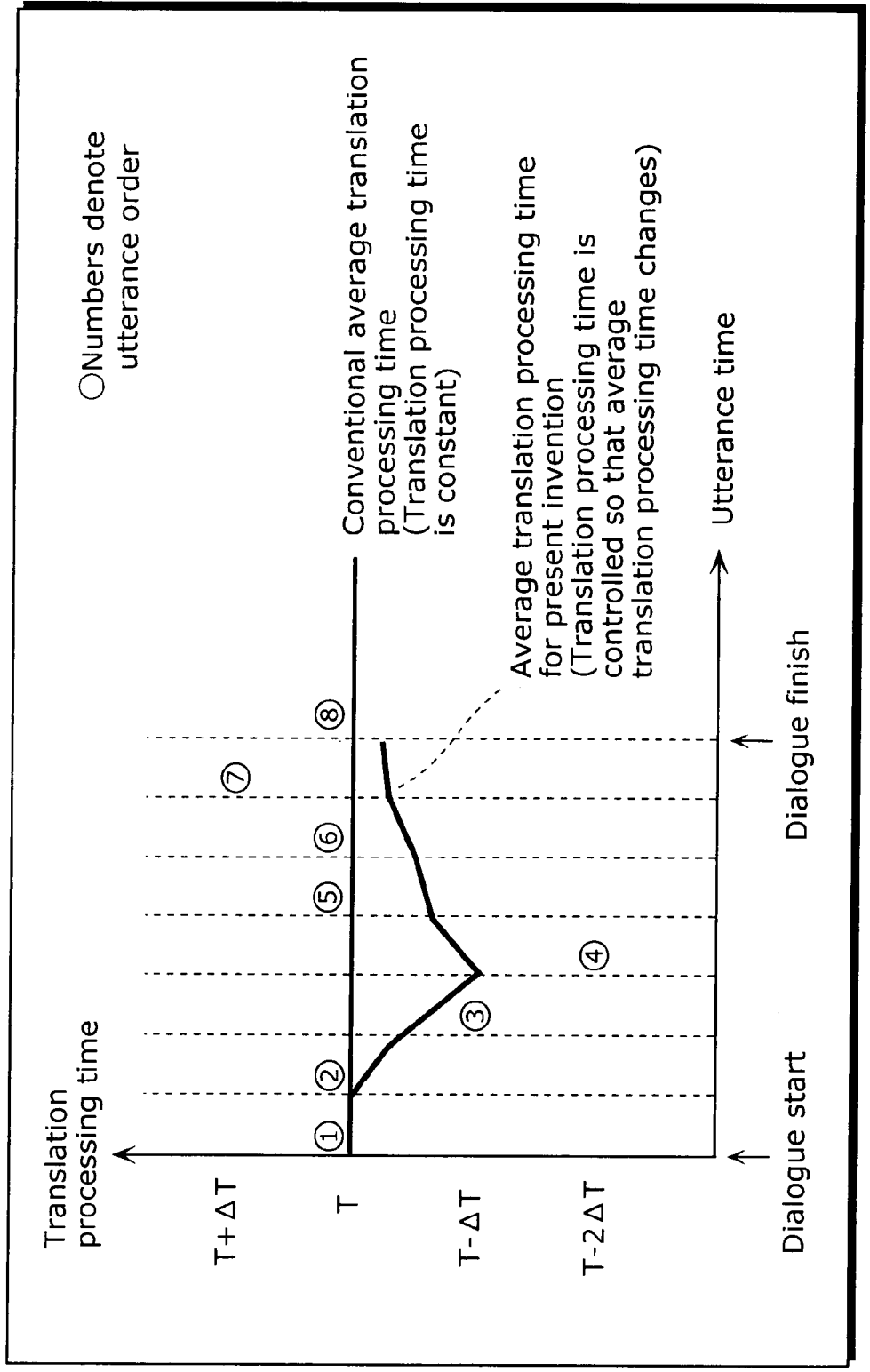

FIG. 24

| Characteristic type | No. | Characteristic (Language 1) | Characteristic (Language 2) | Coefficient α |
|---|---|---|---|---|
| Mutual understanding | 1 | 明白 | all right | -1 |
|  | 2 | 当然 | of course | -1 |
|  | 3 | 明白 | i see | -1 |
|  | 4 | 是 | yes | -1 |
|  | 5 | 好吧 | ok | -1 |
|  | 6 | 正是这样 | you're right | -1 |
|  | 7 | 不用说 | not to mention | -1 |
|  | 8 | 正如你知道的那样 | as you know | -1 |
| Continuity of surface expressions | 1 | *和*哪个* | which *,* or * | -1 |
|  | 2 | 哪里* | where * | 1 |
|  | 3 | *什么* | what * | 1 |
| Change of topic | 1 | 可是 | by the way | reset |
|  | 2 | 总之 | anyway | reset |
|  | 3 | 换个话题 | another topic | reset |
|  | 4 | 明白了 | certainly | reset |
|  | 5 | 那么 | so | reset |

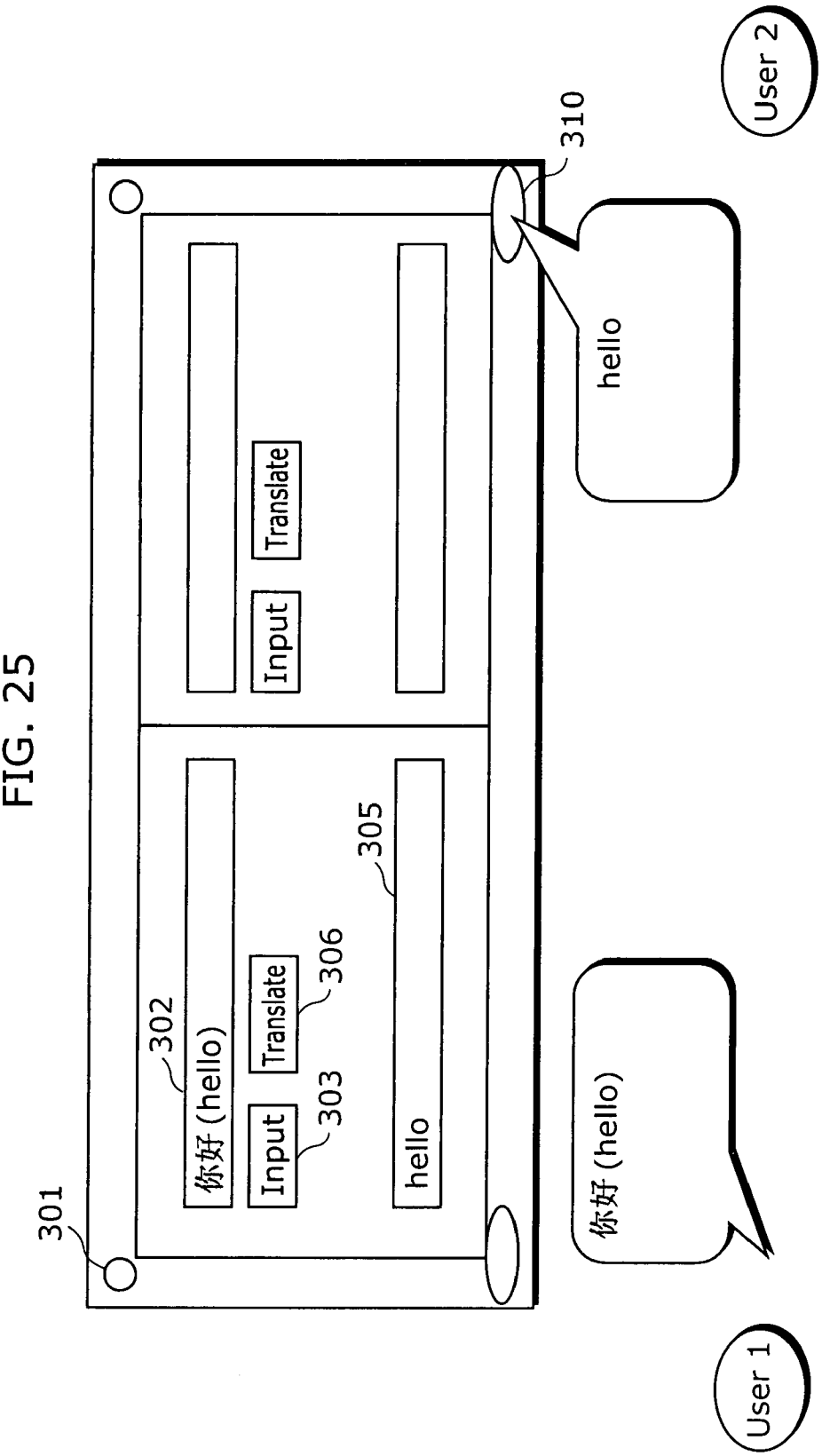

FIG. 26

| Utterance order | Speaker | Utterance information | Translated utterance information/ likelihood | Operation of time calculation unit 204 |
|---|---|---|---|---|
| (Initialization) | | | | t=T |
| 1 | User 1 | 你好(hello) | hello/1.0 | t=T |
| | | | | |
| | | | | |
| | | | | |

901 spans: Utterance order, Speaker, Utterance information
902: Translated utterance information/likelihood
903: Operation of time calculation unit 204

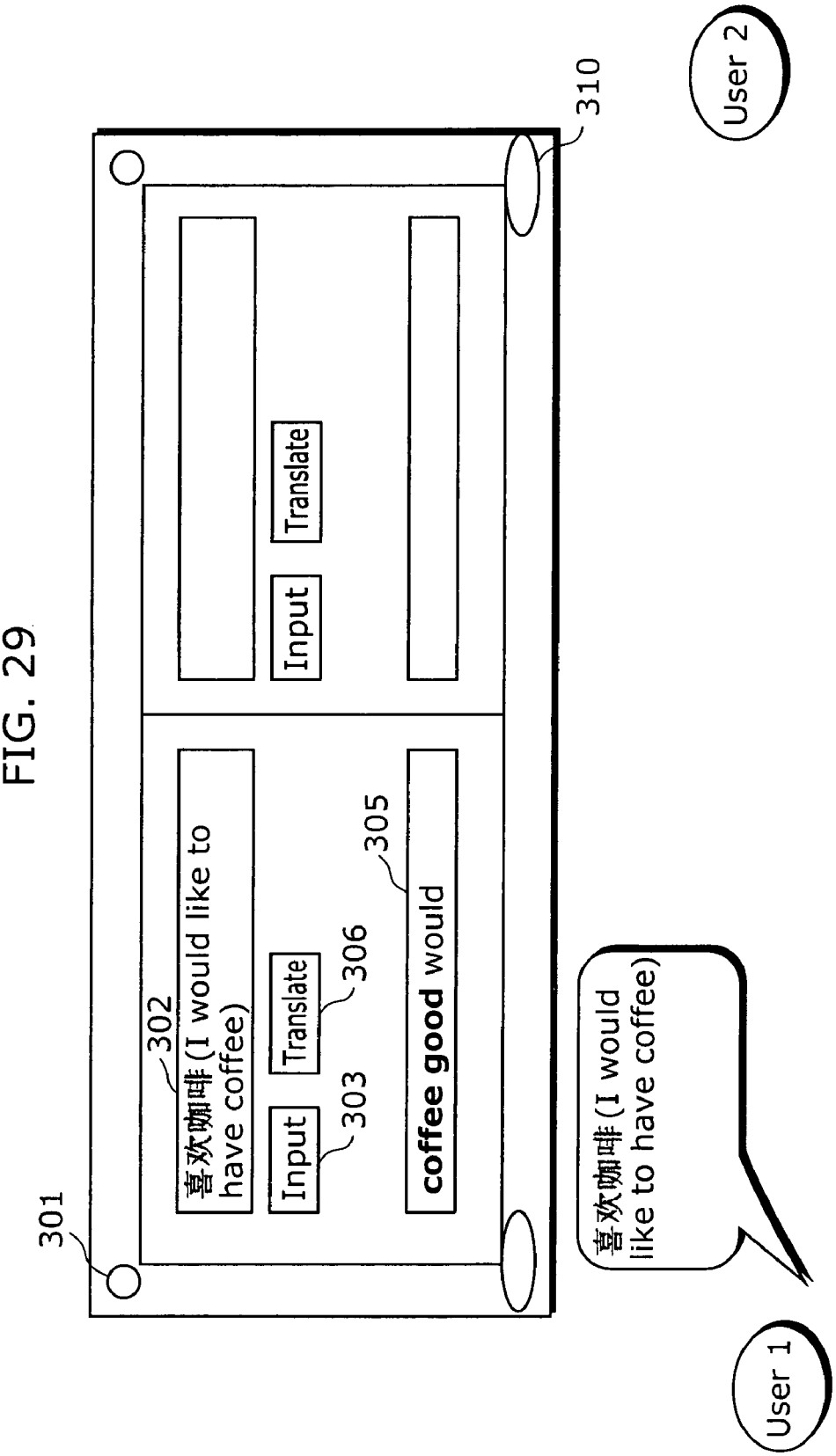

FIG. 30

| Utterance order | Speaker | Utterance information | Translated utterance information/ likelihood | Operation of time calculation unit 204 |
|---|---|---|---|---|
| (Initialization) | | | | t=T |
| 1 | User 1 | 你好(hello) | hello/1.0 | t=T |
| 2 | User 2 | which do you like tea or coffee | 茶和咖啡喜欢哪个 (Which do you like, tea or coffee?)/0.9 | t=T-ΔT |
| 3 | User 1 | 喜欢咖啡 (I would like to have coffee) | coffee good would /0.5 | t=T-ΔT |
| | | | | |

1301 spans Utterance order, Speaker, Utterance information; 1302 is Translated utterance information/likelihood; 1303 is Operation of time calculation unit 204.

FIG. 31A

Table 1402 — Translation processing time total: 8T−2ΔT

| Utterance order | Speaker | Utterance information | Translated utterance information/likelihood | Operation of time calculation unit 204 |
|---|---|---|---|---|
| (Initialization) | | | | t=T |
| 1 | User 1 | 你好(hello) | hello/1.0 | t=T |
| 2 | User 2 | which do you like tea or coffee | 茶和咖啡喜欢哪个(Which do you like, tea or coffee?)/0.9 | t=T−ΔT |
| 3 | User 1 | 当然是喜欢咖啡(Of course I would like to have coffee) | of course coffee good would/0.5 | t=T−2ΔT |
| 4 | User 2 | certainly | 明白了(Certainly)/1.0 | t=T |
| 5 | User 1 | 请问有什么甜点吗(In addition, do you have anything sweet) | in addition to something sweet is there /0.7 | t=T |
| 6 | User 2 | pardon | 什么(Pardon)/1.0 | t=T+ΔT |
| 7 | User 1 | 请问有什么甜点吗(In addition, do you have anything sweet) | do you have anything sweet /0.9 | t=T |
| 8 | User 2 | we have cake and cookie | 有蛋糕和曲奇饼干(We have cake and cookie)/0.9 | |

FIG. 31B

Table 1401 — Translation processing time total: 8T

| Utterance order | Speaker | Utterance information | Translated utterance information/likelihood |
|---|---|---|---|
| (Initialization) | | | |
| 1 | User 1 | 你好(hello) | hello/1.0 |
| 2 | User 2 | which do you like tea or coffee | 茶和咖啡喜欢哪个(Which do you like, tea or coffee?)/0.9 |
| 3 | User 1 | 当然是喜欢咖啡(Of course I would like to have coffee) | of course coffee i would like to have coffee/0.9 |
| 4 | User 2 | certainly | 明白了(Certainly)/1.0 |
| 5 | User 1 | 请问有什么甜点吗(In addition, do you have anything sweet) | in addition to something sweet is there /0.7 |
| 6 | User 2 | pardon | 什么(Pardon)/1.0 |
| 7 | User 1 | 请问有什么甜点吗(In addition, do you have anything sweet) | in addition to something sweet is there /0.7 |
| 8 | User 2 | pardon | 什么(Pardon)/1.0 |

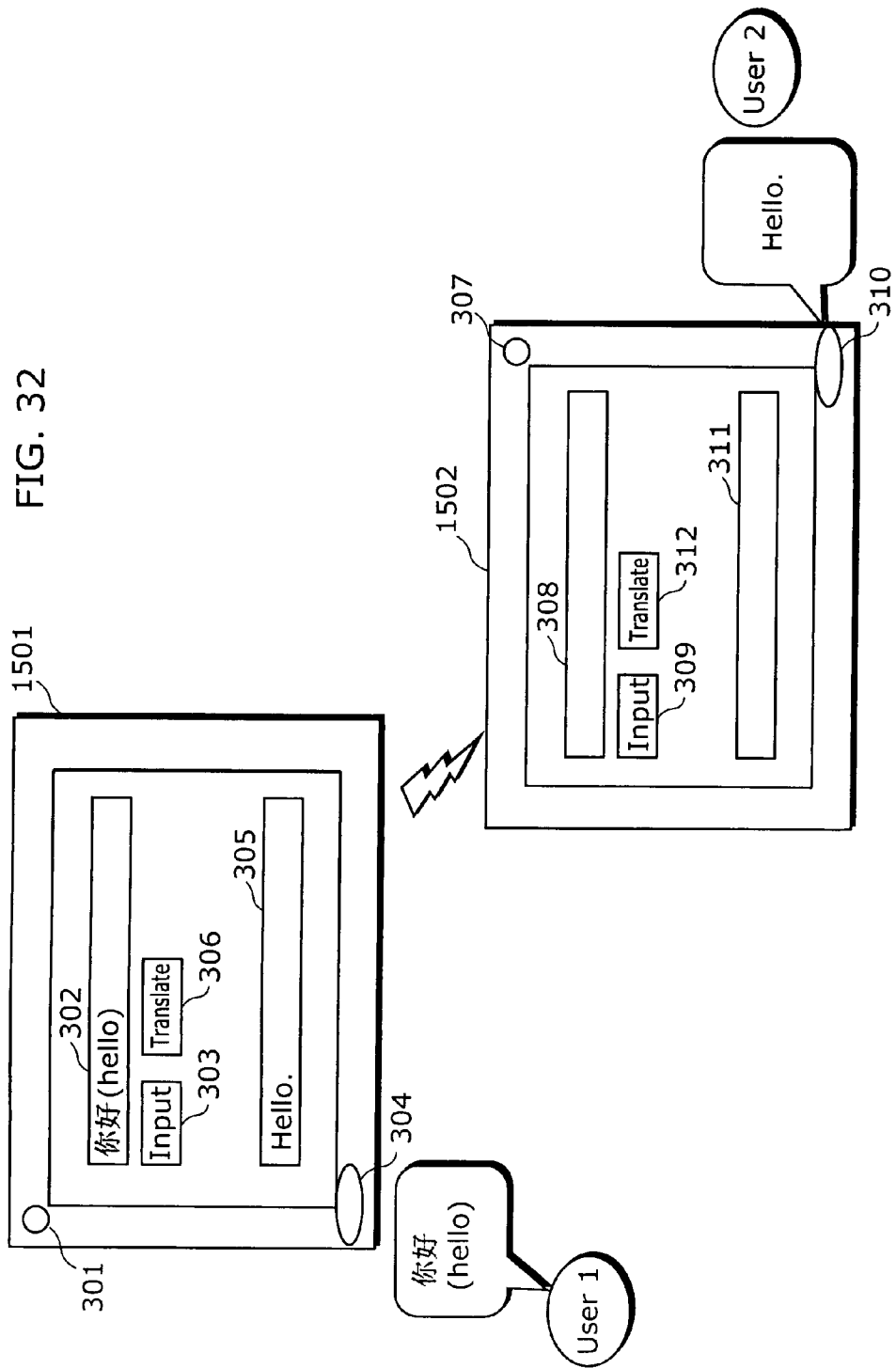

DIALOGUE SUPPORTING APPARATUS

CROSS REFERENCE TO RELATED APPLICATION(S)

This is a continuation application of PCT Patent Application No. PCT/JP2006/022129 filed on Nov. 7, 2006, designating the United States of America.

BACKGROUND OF THE INVENTION (1) Field of the Invention

The present invention relates to a dialogue supporting system which supports person-to-person dialogue.

(2) Description of the Related Art

Automatic translation techniques are being developed for the purpose of supporting inter-lingual dialogue when ordinary people converse with locals during overseas travel. Among the machine translation techniques, the statistical machine translation method and the syntax transfer method are well known. In the syntax transfer method, a dictionary, grammar and the like are held, as a database, within an automatic translation apparatus, and an inputted sentence is analyzed using the dictionary and grammar. It is a method in which the sentence is converted to another language based on an understanding of its meaning.

In contrast, the statistical machine translation method holds a large number of pairings (referred to as parallel corpora) for a certain language and a language which is the conversion target. In the process of being used by a user, conversion trends, such as which word a certain word is often converted to, or which phrase in another language is often associated with a certain phrase and so on, or statistical characters become markedly apparent. In this manner, the statistical machine translation method is a method in which language conversion is performed based on the conversion trends and statistical qualities of words and phrases, without regard for grammar.

Among such automatic translation techniques, the syntax transfer method has the disadvantage in that maintenance of the dictionary, grammar, and the like, is troublesome. For example, when an unknown sentence comes up, dealing with the new sentence is not possible unless such sentence and words are analyzed and added to the dictionary by a person. In contrast, the statistical machine translation method has an advantage in that it is sufficient to merely increase the parallel corpora corresponding to such sentence. In other words, unlike the automatic translation techniques such as syntax transfer method and interlingua method, the statistical machine translation method virtually does not require manual analysis of language data and addition of additional information, and improvement of translation performance can be expected simply through parallel corpus addition. On the other hand, in the statistical machine translation method, optimal conversion is performed by following a probability formula and searching within the parallel corpora for an affiliation with which the probability value is highest. This process has an extremely high processing load and has the disadvantage of taking considerable time until the parallel translation is found. Recently, with the increase in CPU speed and main memory capacity, development of statistical machine translation methods based on a large number of parallel corpora is actively being carried out. Currently, the focus of research and development is placed on the optimization of language models and translation models, increasing decoding (translation processing) accuracy, and automatic evaluation of translation quality (see, for example, Patent Reference 1: Japanese Laid-Open Patent Application No. 2004-102946 and Non-Patent Reference 1: Y. Akiba, M. Federico, N. Kando, H. Nakaiwa, M. Paul, 3. Tsuiji: "Overview of the IWSLT04 Evaluation Campaign", International Workshop on Spoken Language Translation (INTERSPEECH2004-ICSLPSatellite Workshop), 2004).

SUMMARY OF THE INVENTION

In the case where dialogue is to be carried out using such an automatic translation techniques, dialogue is carried out with two persons speaking different languages alternately using the automatic translation function of a dialogue supporting apparatus. FIG. 1 is a table showing an example of average processing times required for decoding in accordance with the number of words which make up a sentence, in a conventional statistical translation method dialogue supporting apparatus. FIG. 1 is an extract from Japanese Laid-Open Patent Application No. 2004-102946 and shows the average processing time for decoding in the statistical translation method using parallel corpora of 172,481 sentences which appear frequently in everyday conversation. In this example, even when the newest calculating device is used, the average processing time for decoding requires 47 seconds or more for Japanese-to-English, and 52 seconds or more for English-to-Japanese. In other words, this means that 1 minute and 39 seconds or more is required from the time a speaker says a word to a partner to the time a word is received by the speaker from the partner in reply. In general, since the decoding process is proportional to the number of parallel corpora and the number of words in the input sentence, there are many instances where more time is required. As such, with the statistical translation method in particular, there is the problem that, since the time a user has to wait for the decoding process is long, dialogue supporting apparatuses are not suitable for practical use.

Furthermore, with the statistical translation method in particular, as shown in section 3.3 of Non-Patent Reference 1, in an experiment which compares the automatic evaluation result for translation quality with the result of subjective evaluation by a person, there are cases where no correlation was found between the evaluation values for the same translation, and instead, there were cases having a negative correlation. In other words, although the spending of a predetermined amount of time is required for the decoding processes, there is a problem in that spending an excessive amount of time only results in making the partner to wait, without necessarily leading to better translation quality.

The present invention has as an object to provide a dialogue supporting apparatus which promptly completes inter-lingual dialogue by determining the time for which a partner will be made to wait, in other words the translation output time, before starting the translation process, and immediately conveying a translation with sufficient quality for continuing the dialogue.

In order to solve the conventional problem, the dialogue supporting apparatus in the present invention is a dialogue supporting apparatus which supports a dialogue carried out in different languages, the dialogue supporting apparatus including: an input accepting unit which accepts an utterance of a user as an input; a translation processing unit which translates the accepted utterance into a predetermined language, and outputs translated utterance information which is acquired through the translation; an output notification unit which notifies the outputted translated utterance information to a user; and an output time determination unit which analyzes a characteristic included in the utterance of the user, and to determine an output time for translation of an utterance which is to be accepted subsequently.

Furthermore, the present invention can be implemented, not only as the dialogue supporting apparatus mentioned above, but also as a dialogue supporting method having the characteristic constituent elements included in such dialogue supporting apparatus as steps, and also as a program which causes a computer to execute such steps. Furthermore, it goes without saying that such a program can be delivered via a recording medium such as a CD-ROM and a transmission medium such as the Internet.

Since the processing time needed to obtain a sufficient translation for achieving mutual understanding is set by the output time determination unit before the translation processing unit starts the translation process, the inter-language dialogue which is supported by the automatic translation function is promptly completed. Furthermore, depending on circumstances, the setting of a processing time which is longer than that which is conventional may occur. However, in such a case, a translation with a higher likelihood can be attained, thus increasing the partner's level of understanding and, as a result, there is the effect that the time it takes to achieve mutual understanding is shortened.

Further Information about Technical Background to This Application

The disclosure of Japanese Patent Application No. 2005-328096 filed on Nov. 11, 2005 including specification, drawings and claims is incorporated herein by reference in its entirety.

The disclosure of PCT Patent Application No. PCT/JP2006/322129 filed on Nov. 7, 2006, including specification, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a table showing an example of average processing times needed for decoding in accordance with the number of words which make up a sentence, in a conventional dialogue supporting apparatus (Prior Art);

FIG. 9 is a diagram showing and example of the data configuration of the table held by the calculation resource information unit shown in FIG. 3 (First Embodiment);

FIG. 10 is a diagram showing an example of the data configuration of the characteristics table held by the dialogue history analysis unit shown in FIG. 3 (First Embodiment);

FIG. 11 is a table showing an example of the contents of the dialogue history storage unit shown in FIG. 3 and initial values of the upper limit of the search time derived by the time calculation unit 204 in accordance with the contents (First Embodiment);

FIG. 13 is a diagram showing an example of the contents of the dialogue history storage unit which is updated with respect to the utterance by the user 1 shown in FIG. 12, and the upper limit t, for the subsequent search time, derived by the time calculation unit in accordance with the contents (First Embodiment);

FIG. 14 is a diagram showing an example of the output and the display of translated utterance information of the dialogue supporting apparatus when the user 2 makes an utterance in response to the utterance by the user 1 (First Embodiment);

FIG. 15 is a diagram showing an example of the contents of the dialogue history storage unit which is again updated with respect to the utterance by the user 2 shown in FIG. 14, and the upper limit t, for the subsequent search time, derived by the time calculation unit in accordance with the contents (First Embodiment);

FIG. 17 is a diagram showing an example of the contents of the dialogue history storage unit which is again updated with respect to the utterance by the user 1 shown in FIG. 16, and the upper limit t, for the subsequent search time, derived by the time calculation unit in accordance with the contents (First Embodiment);

FIG. 18 is a diagram comparing the effect produced by the dialogue supporting apparatus in the present invention and a dialogue supporting apparatus of the conventional method in terms of dialogue history and search time upper limit (First Embodiment);

FIG. 19 is a graph showing a comparison between the average translation processing time for the dialogue supporting apparatus in the present invention and the average translation processing time with the conventional method (First Embodiment);

FIG. 24 is a diagram showing an example of the data configuration of the characteristics table in the case where language 1 is Chinese and language 2 is English (Second Embodiment);

FIG. 25 is a diagram showing an example of the output and the display of translated utterance information of the dialogue supporting apparatus when the user 1 makes an initial utterance (Second Embodiment);

FIG. 26 is a diagram showing an example of the contents of the dialogue history storage unit which is updated with respect to the utterance by the user 1 shown in FIG. 25, and the upper limit t, for the subsequent search time, derived by the time calculation unit in accordance with the contents (Second Embodiment);

FIG. 29 is a diagram showing an example of the output and the display of the translated utterance information of the dialogue supporting apparatus when the user 1 makes an utterance in response to the utterance by the user 2 shown in FIG. 27 (Second Embodiment);

FIG. 30 is a diagram showing an example of the contents of the dialogue history storage unit which is again updated with respect to the utterance by the user 1 shown in FIG. 29, and the upper limit t, for the subsequent search time, derived by the time calculation unit in accordance with the contents (Second Embodiment);

FIG. 31 is a diagram comparing the effect produced by the dialogue supporting apparatus in the present invention and a dialogue supporting apparatus of the conventional method in terms of dialogue history and search time upper limit (Second Embodiment);

FIG. 32 is a block diagram showing the configuration of a variation of the dialogue supporting apparatus in the present invention (Second Embodiment)

DESCRIPTION OF THE PREFERRED EMBODIMENTS

Figure 2:
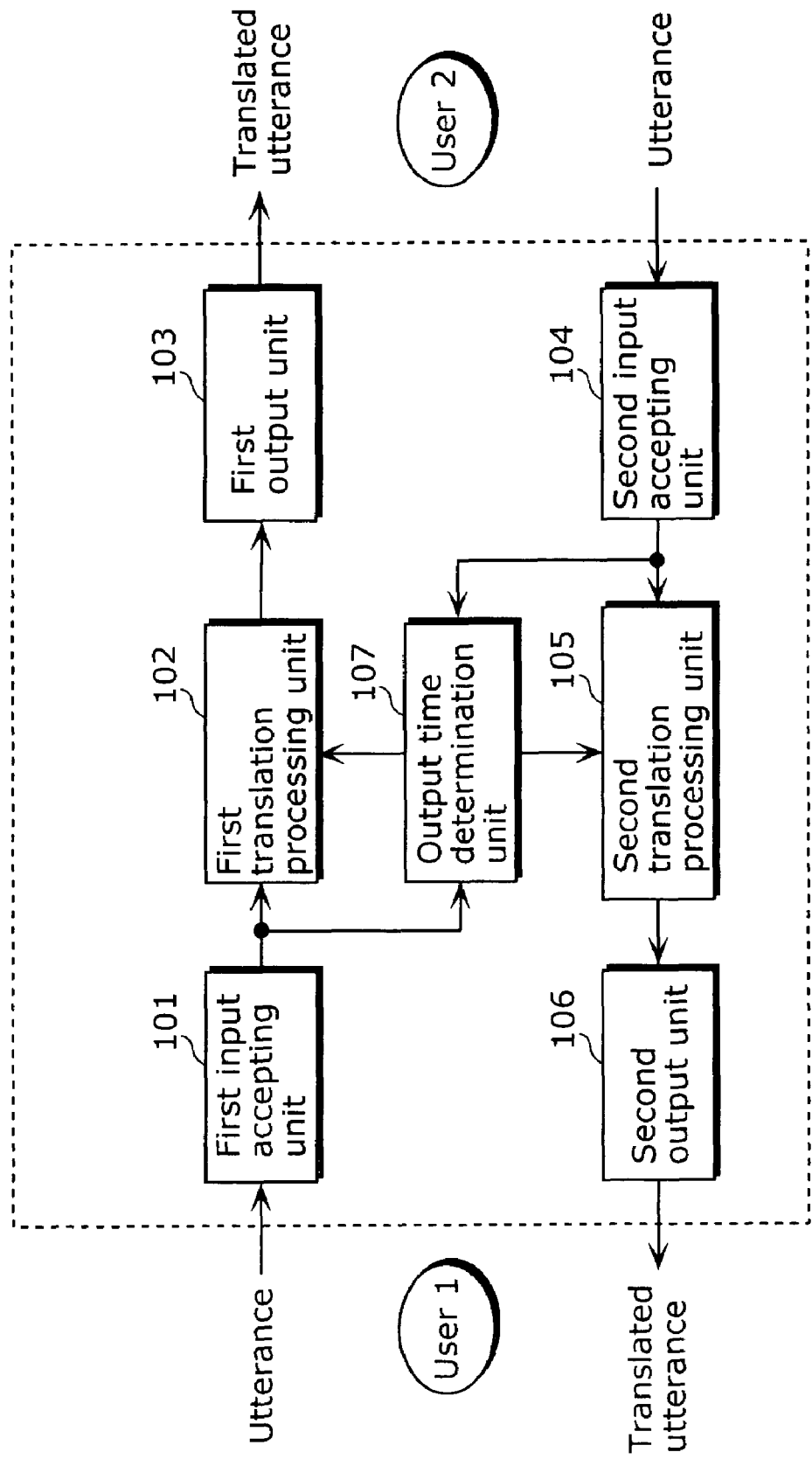
FIG. 2 is a block diagram showing the structure of an embodiment of the dialogue supporting apparatus in the present invention (First Embodiment)

The dialogue supporting apparatus in the present apparatus is a dialogue supporting apparatus which supports a dialogue carried out in different languages, the dialogue supporting apparatus including: an input accepting unit which accepts an utterance of a user as an input; a translation processing unit which translates the accepted utterance into a predetermined language, and outputs translated utterance information which is acquired through the translation; an output notification unit which notifies the outputted translated utterance information to a user; and an output time determination unit which analyzes a characteristic included in the utterance of the user, and to determine an output time for translation of an utterance which is to be accepted subsequently. Accordingly, the dialogue supporting apparatus is able to analyze the characteristic included in the utterance of the user, and determine the translation time for translating an utterance to be accepted subsequently. In other words, in the case where the characteristic included in an utterance indicates that the meaning of the subsequent utterance can be communicated even if its translation is not so fluent, the translation time for such subsequent utterance can be shortened. Furthermore, in the case where the characteristic included in an utterance indicates that the meaning of the subsequent utterance cannot be communicated if its translation is not fluent, the translation time for such subsequent utterance can be lengthened.

Furthermore, it is also possible that the input accepting unit in the present invention includes: a first input accepting unit which accepts, as an input, an utterance of a first user which is in a first language; and a second input accepting unit which accepts, as an input, an utterance of a second user which is in a second language, the translation processing unit includes: a first translation processing unit which translates the utterance of the first user into the second language, and outputs first translated utterance information which is acquired through the translation; and a second translation processing unit which translates the utterance of the second user into the first language, and outputs second translated utterance information which is acquired through the translation, the output notification unit includes: a first output notification unit which notifies the outputted first translated utterance information to the second user; and a second output notification unit which notifies the outputted second translated utterance information to the first user, the output time determination unit analyzes a characteristic included in the utterance of the first user or the utterance of the second user, and determines an output time indicating an upper limit of a translation time for the translation, by the first translation processing unit or the second translation processing unit, of an utterance to be accepted subsequent to the utterance of the first user or the utterance of the second user, and the first translation processing unit or the second translation processing unit outputs the first translated utterance information or the second translated utterance information which is a translation result acquired by the output time. Accordingly, the dialogue supporting apparatus is able to determine the output time indicating the upper limit of the translation time for the subsequent utterance in accordance with the content of the utterance of the first user or the utterance of the second user, and output the translation result which is acquired by such output time.

Here, it is also possible that the translation processing unit performs a translation process according to a statistical translation method. The statistical machine translation method, in particular, has a property in which, although an appropriate parallel translation cannot be acquired unless at least a predetermined amount of translation time is spent, spending translation time beyond a certain level does not necessarily achieve a translation which is proportionally good as the amount of translation time spent. As such, with the dialogue supporting apparatus in the present invention, there is the effect that, even when the first translation processing unit or the second translation processing unit outputs the translation result acquired by the output time, as long as the output time determination unit determines an output time within the predetermined range, a translation result equal to or greater than a predetermined level can be acquired.

In addition, it is also possible that the output time determination unit in the present invention holds, in an order of utterance, a history of first utterance information and second utterance information, and determines the output time for first utterance information or second utterance information which is held subsequently, by referring to a characteristic of a prior first utterance information or second utterance information included in the history, the first utterance information depicting the utterance of the first user as a character string, and the second utterance information depicting the utterance of the second user as a character string. As such, with the dialogue supporting apparatus in the present invention, it is possible to determine the output time based on a history which holds first utterance information or second utterance information in order of utterance.

Furthermore, it is also possible that a type of the characteristic, which is a basis for the determination of the output time by the output time determination unit, is a mutual understanding, and the output time is determined so that the translation time is shortened in the case where, according to a result of the analysis, a characteristic indicating mutual understanding is included in the accepted utterance. Here, in the case where a characteristic indicating a mutual understanding is included in the utterance, this indicates that the understanding between the users with respect to the dialogue content is deep. As such, it is assumed that, even when the translation result is not so fluent, communication can be achieved. For this reason, with the dialogue supporting apparatus in the present invention, in the case where a characteristic indicating a mutual understanding is included in the utterance, the translation result can be outputted in a shorter amount of time, and the dialogue can be advanced smoothly.

Furthermore, it is also possible that a type of the characteristic, which is a basis for the determination of the output time by the output time determination unit, is a continuity of surface expressions, and the output time is determined so that the translation time is: shortened in the case where, according to a result of the analysis, a characteristic indicating a continuity of surface expressions is included in the accepted utterance; and lengthened in the case where, according to a result of the analysis, a characteristic indicating a non-continuity of surface expressions is included in the accepted utterance. Here, in the case where a characteristic indicating a continuity of surface expressions is included in the utterance, there is a high possibility that a part of the surface expressions used in the utterance will, in continuation, be included in the next utterance and, as long as such surface expression is acquired, it is assumed that communication can be achieved even when the translation result for the entire subsequent utterance is not so fluent. For this reason, with the dialogue supporting apparatus in the present invention, in the case where a characteristic indicating a continuity of surface expressions is included in the utterance, the translation result can be outputted in a shorter amount of time, and the dialogue can be advanced smoothly. On the contrary, in the case where a characteristic indicating a non-continuity of surface expressions is included in the utterance, there is a low possibility that a part of the surface expressions used in the utterance will, in continuation, be included in the next utterance, and there are many instances where such expressions are important. For this reason, with the dialogue supporting apparatus in the present invention, in the case where a characteristic indicating a non-continuity of surface expressions is included in the utterance, it is possible to attempt communication by outputting a more plausible and fluent translation result.

Furthermore, it is also possible that a type of the characteristic, which is a basis for the determination of the output time by the output time determination unit, is a change of topic, and the output time is determined to be an initial value so that the translation time is of a standard length in the case where, according to a result of the analysis, a characteristic indicating a change of topic is included in the accepted utterance. Here, in the case where a characteristic indicating a change of topic is included in the utterance, it is assumed that relevance with the content of the dialogue will be lost in the vicinity of such utterance. For this reason, with the dialogue supporting apparatus in the present invention, in the case where a characteristic indicating a change of topic is included in the utterance, it is possible to output a translation result which is acquired in a standard amount of translation time.

It is also possible that the dialogue supporting apparatus in the present invention further includes a calculation resource information unit which provides information regarding a calculation resource of the dialogue supporting apparatus, wherein the output time determination unit determines the output time of the first translated utterance information or the second translated utterance information by referring to the information regarding the calculation resource. Accordingly, the dialogue supporting apparatus in the present embodiment is able to determine an output time which takes into consideration the calculation resources of the dialogue supporting apparatus.

Furthermore, it is also possible that at least one of the first output notification unit and second output notification unit includes: a speech synthesis unit which reproduces first translated utterance information and/or second translated utterance information through synthesized speech; and a character image display unit which displays first translated utterance information and/or second translated utterance information. Accordingly, the dialogue supporting apparatus in the present invention is able to notify the first translated utterance information and/or the second translated utterance information to the first user and/or the second user through speech synthesizing and character image display. As such, even when it is difficult to hear the first translated utterance information and/or the second translated utterance information just with the speech synthesizing, more accurate understanding by the first user and/or the second user is possible by checking the display output of the character image display unit.

Furthermore, it is also possible that the speech synthesis unit in the present invention does not operate in the case where a likelihood of the first translated utterance information and/or the second translated utterance information is lower than a predetermined threshold value. Accordingly, the dialogue supporting apparatus in the present invention is able to prevent mishearing or misunderstanding of the dialogue content caused by listening to the voice synthesizing of first translated utterance information and/or the second translated utterance information having a likelihood which is lower than a predetermined threshold value.

It is also possible that the character image display unit in the present invention displays in highlighted manner only independent words included in the first translated utterance information and/or the second translated utterance information, in the case where a likelihood of the first translated utterance information and/or the second translated utterance information is lower than a predetermined threshold value. Accordingly, with the dialogue supporting apparatus in the present invention, by displaying in highlight only the independent words in the case where the likelihood is lower than a predetermined threshold value, it is possible to prevent a misunderstanding of translation details from being caused by those parts, other than the independent words, which have a low likelihood.

Furthermore, the dialogue supporting system in the present invention is a dialogue supporting system which supports a dialogue carried out in different languages through dialogue supporting apparatuses, for respective users, which carry out mutual communication via a communication network, wherein a first dialogue supporting apparatus includes: a first input accepting unit which accepts, as an input, an utterance of a first user which is in a first language; a first translation processing unit which translates the accepted utterance of the first user into a predetermined language, and outputs first translated utterance information which is acquired through the translation; a first transmission unit which transmits the outputted first translated utterance information to a second dialogue supporting apparatus; a first output time determination unit which analyzes a characteristic included in the utterance of a first user, and determines an output time indicating an upper limit of a translation time for translating an utterance to be accepted subsequent to the utterance of the first user; and a first output time transmission unit which transmits the determined output time to the second dialogue supporting apparatus, and a second dialogue supporting apparatus includes: a second receiving unit which receives the first translated utterance information from the first dialogue supporting apparatus, and notifies the first translated utterance information to a second user; a second output time receiving unit which receives the output time determined by the first dialogue supporting apparatus, from the first dialogue supporting apparatus; a second input accepting unit which accepts, as an input, an utterance of the second user which is in the predetermined language; a second translation processing unit which translates the accepted utterance of the second user into the first language, and outputs second translated utterance information which is acquired through the translation; and a second transmission unit which transmits the outputted second translated utterance information to the first dialogue supporting apparatus, and the second translation processing unit outputs the second translated utterance information which is a translation result acquired by the received output time. Accordingly, the dialogue supporting system in the present invention is able to support the dialogue, carried out in different languages, between users that are located far from each other. Moreover, in addition to this, in the first dialogue supporting apparatus, the output time, which is the upper limit of the translation time for the subsequent utterance, can be determined based on the characteristic included in the utterance of the first user, and, in the second dialogue supporting apparatus, it is possible to output second translated utterance information which is acquired by translating the utterance of the second user into the first language until the output time received from the first dialogue supporting apparatus. In other words, in the second dialogue supporting apparatus, it is possible to carry out the translation process until the upper limit of the translation time which is in accordance with the characteristic included in the utterance of the first user, and output second translated utterance information.

Furthermore, the dialogue supporting system in the present invention is a dialogue supporting system which supports a dialogue carried out in different languages, using a first dialogue supporting apparatus and a second dialogue supporting apparatus which are connected to a server via a communication network, wherein the first dialogue supporting apparatus includes: a first input accepting unit which accepts, as an input, an utterance of a first user which is spoken in a first language; a first transmission unit which transmits the accepted utterance of the first user to the server; a second receiving unit which receives, from the server, second translated utterance information which is a translation result of translating, into the first language, an utterance of a second user in response to the utterance of the first user; and a first output notification unit which notifies the received second translated utterance information to the first user, and the second dialogue supporting apparatus includes: a second input accepting unit which accepts, as an input, an utterance of a second user which is spoken in a second language; a second transmission unit which transmits the accepted utterance of the second user to the server; a first receiving unit which receives, from the server, first translated utterance information which is a translation result of translating, into the second language, an utterance of the first user in response to the utterance of the second user; and a second output notification unit which notifies the received first translated utterance information to the second user, and the server includes: a first utterance receiving unit which receives the utterance of the first user from the first dialogue supporting apparatus; a first translation processing unit which translates the received utterance of the first user into the second language, and outputs first translated utterance information which is acquired through the translation; a first transmission unit which transmits the outputted first translated utterance information to the second dialogue supporting apparatus; a second utterance receiving unit which receives the utterance of the second user from the second dialogue supporting apparatus; a second translation processing unit which translates the received utterance of the second user into the first language, and outputs second translated utterance information which is acquired through the translation; a second transmission unit which transmits the outputted second translated utterance information to the first dialogue supporting apparatus; and an output time determination unit which analyzes a characteristic included in the utterance of the first user or the utterance of the second user that is received, and determines an output time indicating an upper limit of a translation time for the translation, by the first translation processing unit or the second translation processing unit, of an utterance subsequent to the utterance, and the first translation processing unit or the second translation processing unit outputs the first translated utterance information or the second translated utterance information which is a translation result acquired by the determined output time. As such, with the dialogue supporting system in the present invention, it is possible to simplify the configuration of the first dialogue supporting apparatus and the second dialogue supporting apparatus possessed by each user since all of the analysis of the characteristic included in the utterance, the determination of the output time based thereon, and the translation process up to the determined output time is carried out by the server.

The following describes the embodiments of the present invention with reference to the drawings.

First Embodiment

FIG. 2 is a block diagram showing the configuration of the dialogue supporting apparatus in the first embodiment of the present invention. The dialogue supporting apparatus in the present embodiment is an apparatus which supports the dialogue between two users with differing languages, and which has a function for changing, based on a characteristic included in an utterance, the time spent for searching a parallel translation language database with respect to a subsequent utterance. As shown in FIG. 2, the dialogue supporting apparatus includes a first input accepting unit 101, a first translation processing unit 102, a first output unit 103, a second input accepting unit 104, a second translation processing unit 105, a second output unit 106, and an output time determination unit 107. The first input accepting unit 101 accepts an utterance of a user 1 (first user) in a first language (for example, Japanese), and outputs first utterance information depicting the utterance of the user 1 as a character string. The first translation processing unit 102 translates the first utterance information into a second language (a predetermined language; for example, English) spoken by a user 2 (second user), and outputs first translated utterance information and the likelihood of the first translated utterance information. Likelihood refers to an index which indicates the fluency and the accuracy of the meaning of the translated utterance information with respect to the utterance information. The first output unit 103 outputs the first translated utterance information to the user 2 as an utterance through synthesized speech. The second input accepting unit 104 accepts an utterance of the user 2, and outputs second utterance information depicting the utterance of the user 2 as a character string. The second translation processing unit 105 translates the second utterance information into the first language spoken by the user 1, and outputs second translated utterance information and the likelihood of the second translated utterance information. The second output unit 106 outputs the second translated utterance information to the user 1 as an utterance through synthesized speech. With the first utterance information or the second utterance information as an input, the output time determination unit 107 determines an output time which is the upper limit of the processing time (in other words, this means the translation time for the utterance information, and includes parallel translation language database search time as well as a number of loops of a specific process) to be spent by the first translation processing unit 102 or the second translation processing unit 105 for the first utterance information or second utterance information to be inputted subsequently.

Figure 3:
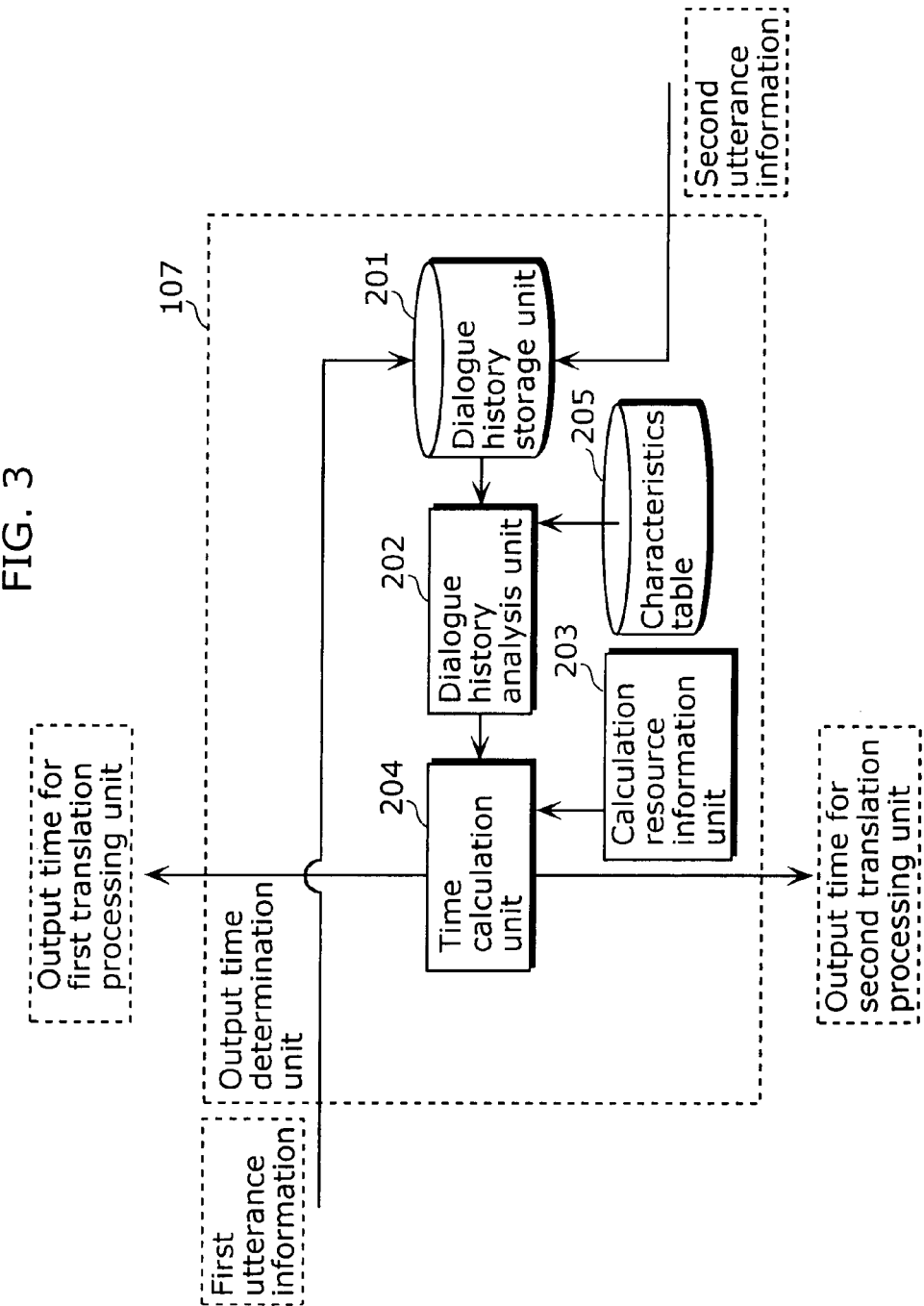
FIG. 3 is a block diagram showing an example of the configuration of the output time determination unit shown in FIG. 2 (First Embodiment)

FIG. 3 is a block diagram showing an example of the configuration of the output time determination unit 107 shown in FIG. 2. The output time determining unit 107 is a processing unit which determines, based on a characteristic of utterance information, the parallel translation language database search time for utterance information to be inputted subsequently, and includes a dialogue history storage unit 201, a dialogue history analysis unit 202, a calculation resource information unit 203, a time calculation unit 204, and a characteristics table 205. The dialogue history storage unit 201 stores the first utterance information and the second utterance information in the order of utterance-time. The characteristics table 205 is a table on which a characteristic of an utterance, which serves as a lead for determining a variance coefficient for the output time, is described. The dialogue history analysis unit 202 compares the contents of the dialogue history storage unit 201 and the contents of the characteristics table 205, judges whether or not a characteristic described in the characteristics table 205 is included in the utterance information stored in the dialogue history storage unit 201 and, when a characteristic is included, outputs the variance coefficient for the output time for such characteristic. In the case where a characteristic is not included, a coefficient $\alpha=0$ is outputted. The calculation resource information unit 203 stores information regarding calculation resources with which the present apparatus operates. The calculation resource information unit 203 detects the operating status of the dialogue supporting apparatus brought about by the influence of running another application within the dialogue supporting apparatus, and obtains the hardware performance of the dialogue supporting apparatus. The calculation resource information unit 203 compares the hardware performance with the reference value in the table shown in FIG. 9, and adjusts the variance margin for the output time. The time calculation unit 204 refers to the output time variance coefficient and the calculation resource information 203, and determines an output time t for the first translation processing unit 102 and the second translation processing unit 105.

Figure 4:
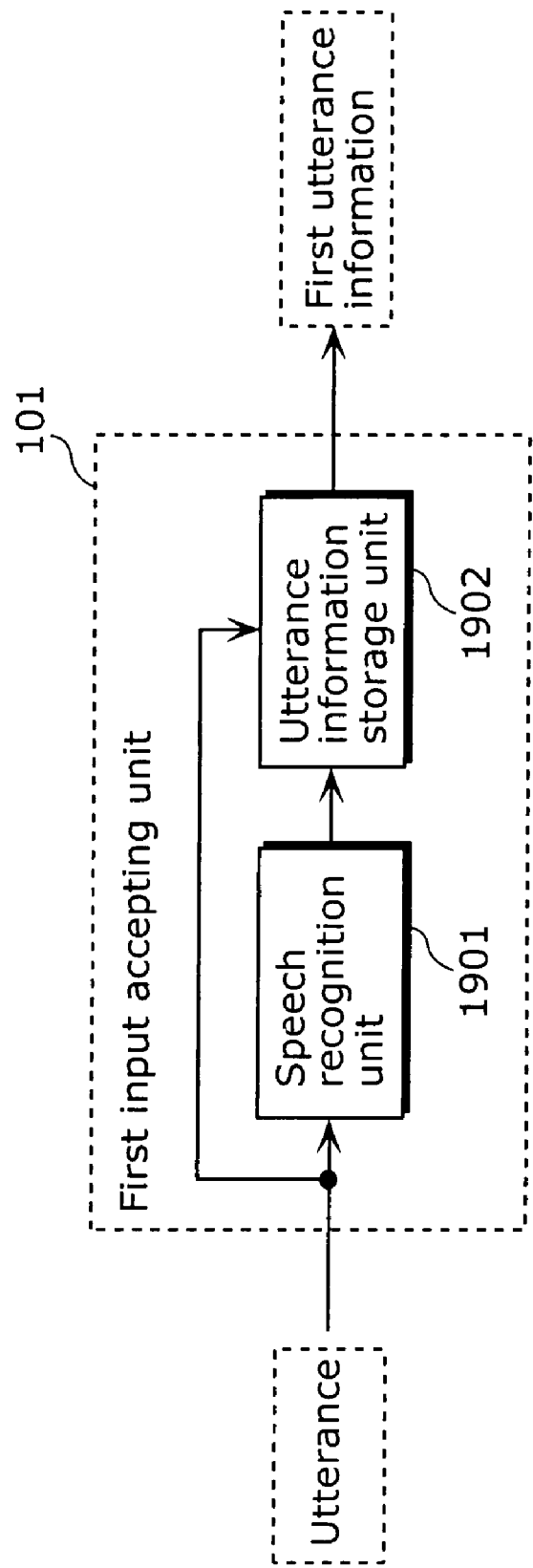
FIG. 4 is a block diagram showing an example of more detailed configuration of the input accepting unit shown in FIG. 2 (First Embodiment)

An utterance inputted by the user 1 through speech or typing is obtained by the first input accepting unit 101, as character information, through continuous speech recognition or a keyboard respectively, and outputted as first utterance information. The first utterance information from the user 1 is a character string equivalent to the utterance by the user 1. FIG. 4 is a diagram showing an example of the configuration of the first input accepting unit in the case where a function for speech recognition processing is included. The first input accepting unit includes a speech recognition unit 1901 and an utterance information storage unit 1902. The speech recognition unit 1901 converts the speech corresponding to the utterance of the user 1 into character information. The utterance information storage unit 1902 temporarily stores the character information outputted by the speech recognition unit 1901. Furthermore, the utterance information storage unit 1902 outputs temporarily stored first utterance information, according to an instruction accompanying the utterance of the user 1. In the same manner, a second utterance inputted by the user 2 through speech or typing is obtained by the second input accepting unit 104, as character information, through continuous speech recognition or a keyboard respectively, and outputted as second utterance information. The second utterance information is a character string equivalent to the second utterance by the user 2.

The first translation processing unit 102 performs a statistical translation process which converts from the language of the user 1 to the language of the user 2. In the statistical translation process, when the language of the user 1 is S and the language of the user 2 is T, obtaining a translation T2 for a first utterance information S1 means calculating for T=T2 which maximizes P(T|S1) in the parallel translation language database for S and T. According to a base theorem, this is equivalent to searching for T=T2 which maximizes P(S1|T)P(T). P(S|T) is a translation model, P(T) is a language model. In addition, the maximum value P(T2|S1) is assumed as the likelihood of translation T2. Likewise, the second translation processing unit 105 performs a statistical translation process which converts from the language of the user 2 to the language of the user 1. In this statistical translation process, when the language of the user 2 is S and the language of the user 1 is T, obtaining a translation T1 for a second utterance information S2 means calculating for T=T1 which maximizes P (T|S2) in the parallel translation language database for S and T. According to a base theorem, this is equivalent to searching for T=T1 which maximizes P(S2|T)P(T). P(S|T) is a translation model, P(T) is a language model. In addition, the maximum value P(T1|S2) is assumed as the likelihood of translation T1. However, neither of these statistical translation processes can continue processing beyond the output time t determined by the output time determination unit 107. The processing is discontinued at the point when the processing time reaches the output time t and, at that point, the optimal translation and likelihood of the translation are outputted.

The first output unit 103 performs a speech synthesizing process and an image display process, and outputs a first translated utterance information to the user 2 as speech or a character image. Furthermore, the first output unit 103 has a threshold value U1. The threshold value U1 is determined from the average value of the likelihood when the first translation processing unit 102 generates translations in which the evaluation value for fluency and accuracy of meaning is a predetermined value of 80%. The speech synthesizing process is not carried out in the case where the likelihood outputted by the first translation processing unit 102 is lower than the threshold value U1 and, out of the words making up the first translated utterance information, only independent words are displayed with highlight. Furthermore, the second output unit 106 performs a speech synthesizing process and an image display process, and outputs second translated utterance information to the user 1 as speech or a character image. In addition, the second output unit 106 has a threshold value U2. The threshold value U2 is determined from the average value of the likelihood when the second translation processing unit 105 generates translations in which the evaluation value for fluency and accuracy of meaning is a predetermined value of 80%. The speech synthesizing process is not carried out in the case where the likelihood outputted by the second translation processing unit 105 is lower than the threshold value U2 and, out of the words making up the second translated utterance information, only independent words are displayed with highlight.

Figure 5:
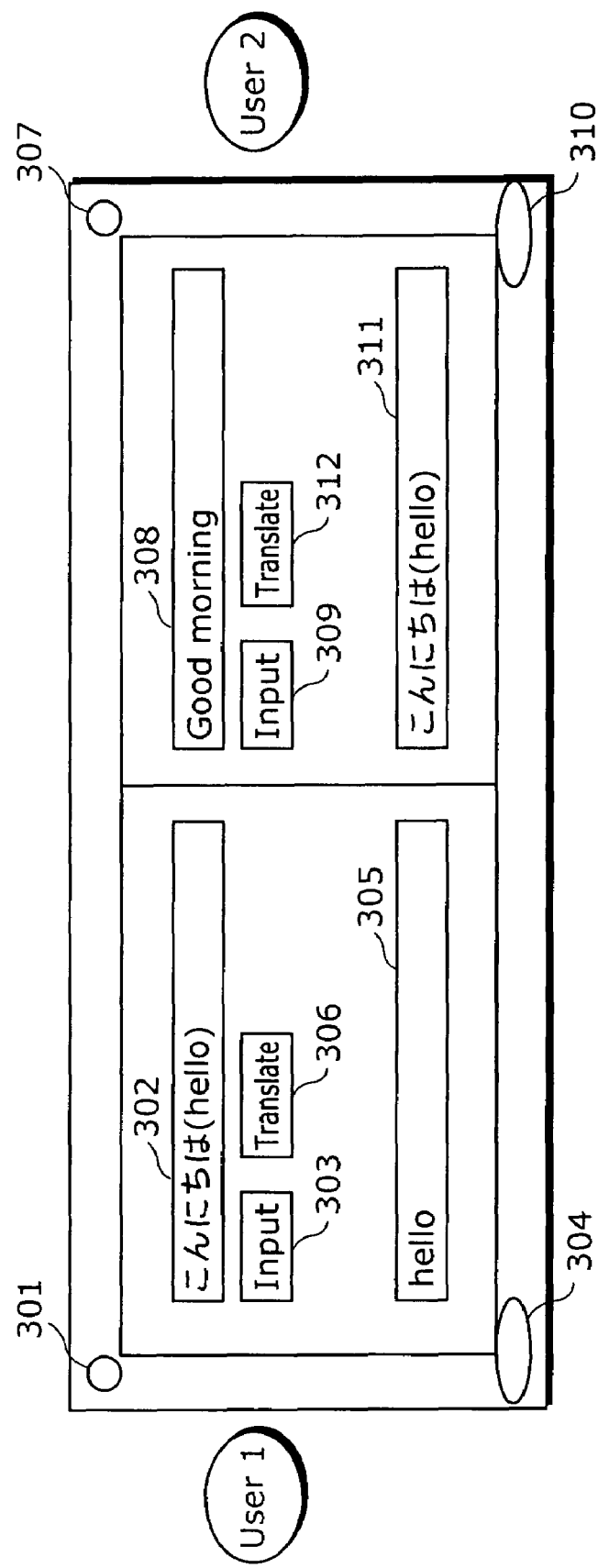
FIG. 5 is a diagram showing the user interface for the first embodiment of the dialogue supporting apparatus in the present invention (First Embodiment)

FIG. 5 is a diagram showing the user interface in an embodiment of the dialogue supporting apparatus of the present invention. FIG. 5 shows a hardware user interface equipped with the present invention. The right-side user interface is used by the user 1, and the left-side user interface is used by the user 2. A microphone 301, input utterance information 302, and an input start button 303 correspond to the first input accepting unit 101; and a speaker 304 and translated utterance information 311 correspond to the second output unit 106. The translation start button 306 is a button for starting the translation process by the first translation processing unit 102. Likewise, a microphone 307, input utterance information 308, and an input start button 309 correspond to the second input accepting unit 104; and a speaker 310, and translated utterance information 305 correspond to the first output unit 103. The translation start button 312 is a button for starting the translation process by the second translation processing unit 105.

Figure 6:
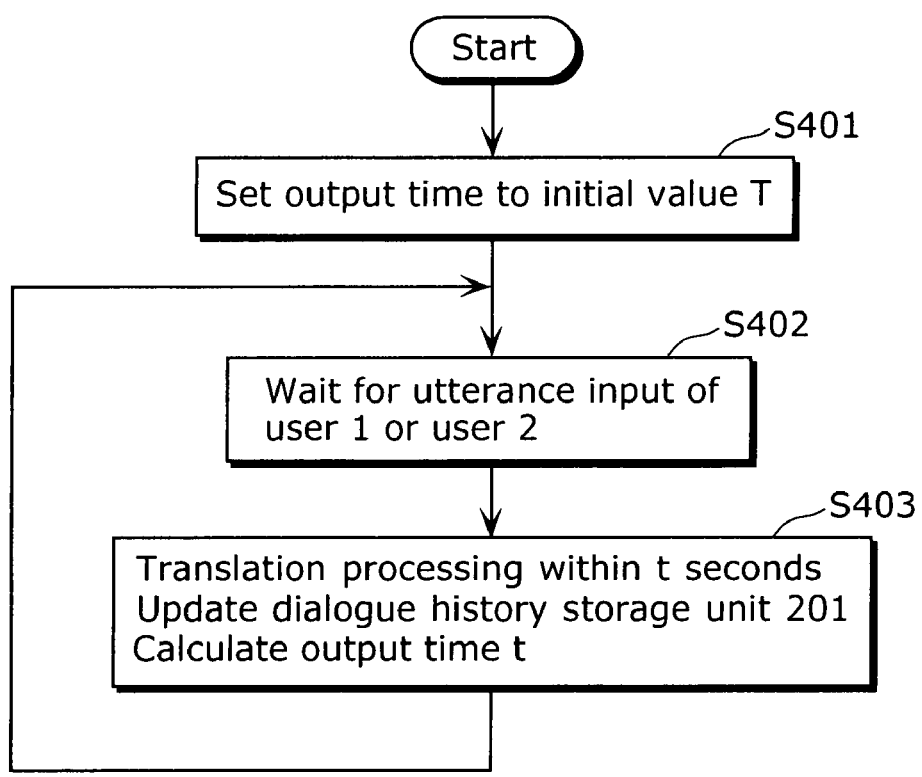
FIG. 6 is a flowchart showing the operation of the dialogue supporting apparatus in the present invention (First Embodiment)

FIG. 6 is a flowchart showing the overall operation of the present invention. In step S401, the output time determination unit 107 sets the output time t to an initial value T before the use of the present apparatus is begun. In step S402, the utterance input of the user 1 or the user 2 is awaited. At the stage where the utterance input is completed, in other words at the point when the translation start button 306 or the translation start button 312 is pressed, the process moves to step S403. In step S403, the first translation processing unit 102 or the second translation processing unit 105 performs the translation process and outputs a translation to the partner, spending a maximum of t seconds of time. At the same time, the output time determination unit 107 updates the content of the dialogue history storage unit 201, and calculates the output time t for the subsequent translation process. Then, the process returns to step S402.

Figure 7:
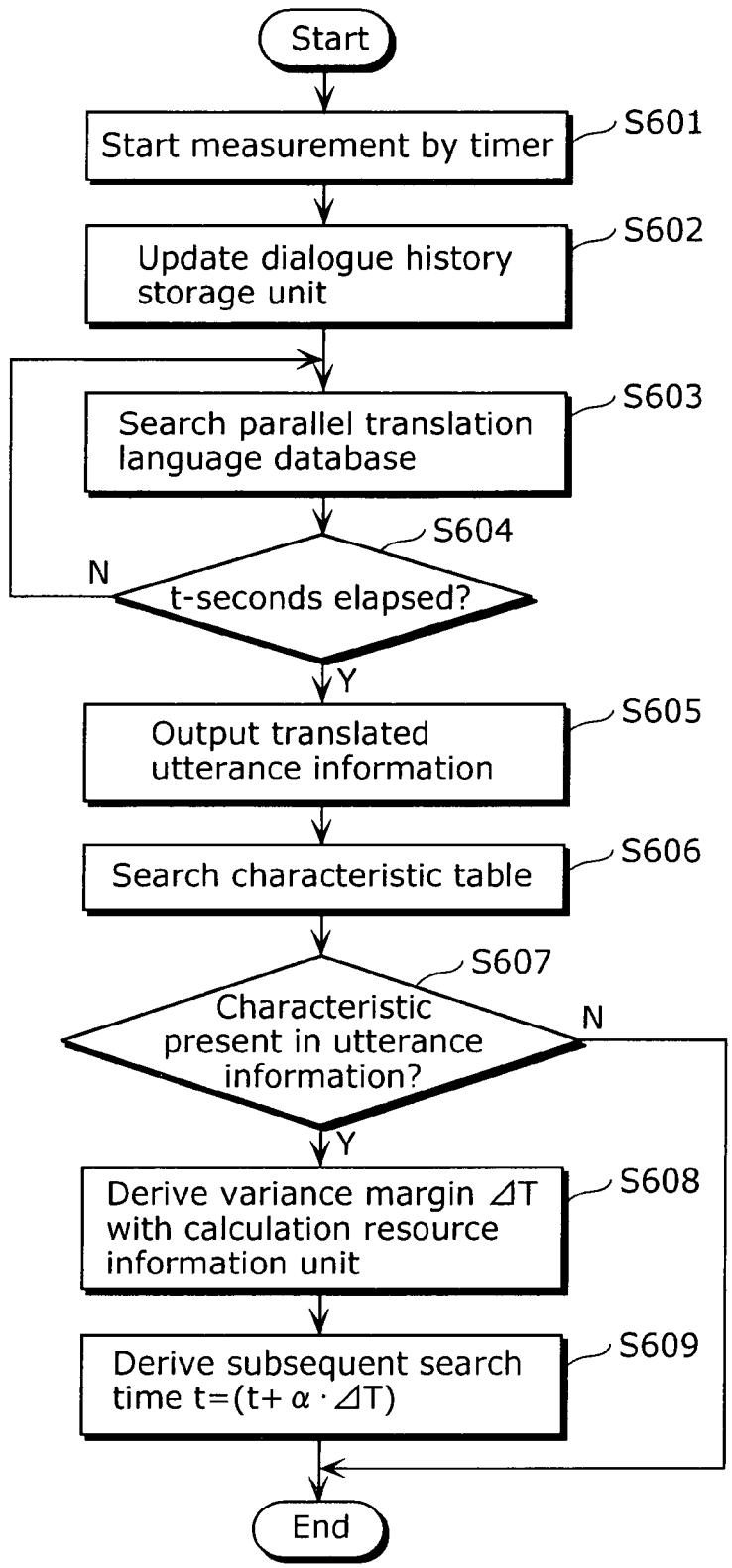
FIG. 7 is a flowchart showing a more detailed operation of the dialogue supporting apparatus in step S403 shown in FIG. 6 (First Embodiment)

In step S403, the calculation for the output time t is specifically calculated in the following manner. First, FIG. 7 is a flowchart showing in more detail the operation of the dialogue supporting apparatus in step S403 in FIG. 6. The first translation processing unit 102 or the second translation processing unit 105 includes an internal timer and, when the translation start button 306 or the translation start button 312 is pressed by the user 1 or the user 2 respectively, the internal timer starts-up and measuring of the output time t (initial value T) set by the output time determination unit 107 starts (S601). The first input accepting unit 101 or the second input accepting unit 104 updates the dialogue history storage unit 201 with an inputted first utterance information or second utterance information (S602). The first translation processing unit 102 or the second translation processing unit 105 searches the parallel translation language database for a parallel translation corpus for which the likelihood is highest with respect to the inputted first utterance information or second utterance information (S603). The first translation processing unit 102 or the second translation processing unit 105 checks the timer and judges whether or not the output time of t seconds set by the output time determination unit 107 has elapsed (S604) and, when not yet elapsed, returns to step S603 and continues searching the parallel translation language database. In the case where the output time of t seconds has elapsed in step S604, the search for the parallel translation corpus is discontinued at that point, and the translated utterance information obtained at that point is outputted (S605).

Next, the dialogue history analysis unit 202, refers to the characteristics table 205 (S606), and analyzes whether or not a characteristic described in the characteristics table 205 is included in the utterance information stored in the dialogue history storage unit 201 (S607). In the case where a characteristic described in the characteristics table 205 is included in the utterance information, the dialogue history analysis unit 202 obtains, from the characteristics table 205, a coefficient α corresponding to the characteristic, and outputs the coefficient to the time calculation unit 204. Furthermore, the time calculation unit 204 refers to the table in the calculation resource information unit 203 and derives a variance margin ΔT (S608) In addition, the time calculation unit 204 derives, from the obtained coefficient α and variance margin ΔT, an output time t=(t+α·ΔT) which is equivalent to the upper limit for the parallel translation language database search time for the subsequent utterance information, and sets a new output time t for the subsequent translation process, then the process ends (S609). Furthermore, in the case where a characteristic described in the characteristics table 205 is not included in the utterance information in step S607, the time calculation unit 204 does not do anything and the process ends. Alternatively, it is also possible that, as an equivalent process, the time calculation unit 204 may assume a coefficient α=0, and set a new output time t for the subsequent translation process, then the process ends. With this, subsequently, when the process in step S403 is started, the internal timer of the first translation processing unit 102 or the second translation processing unit 105 measures the new output time t set by the output time determination unit 107 in this step S609, and the first translation processing unit 102 or the second translation processing unit 105 searches the parallel translation language database until the new output time t elapses.

Note that although it is described above that the output time determination unit 107 calculates the search time for the subsequent utterance after the parallel translation language database search by the first translation processing unit 102 or the second translation processing unit 105 ends, the present invention is not limited to such. For example, it is also possible that the first input accepting unit 101 or the second input accepting unit 104, the first translation processing unit 102 or the second translation processing unit 105, and the output time determination unit 107 perform respective processes in parallel. In other words, it is also possible to have parallel processing for the updating of the dialogue history storage unit 201, the search of parallel translation language database, and the setting of the output time for translated utterance information for the subsequent utterance.

Figure 8:
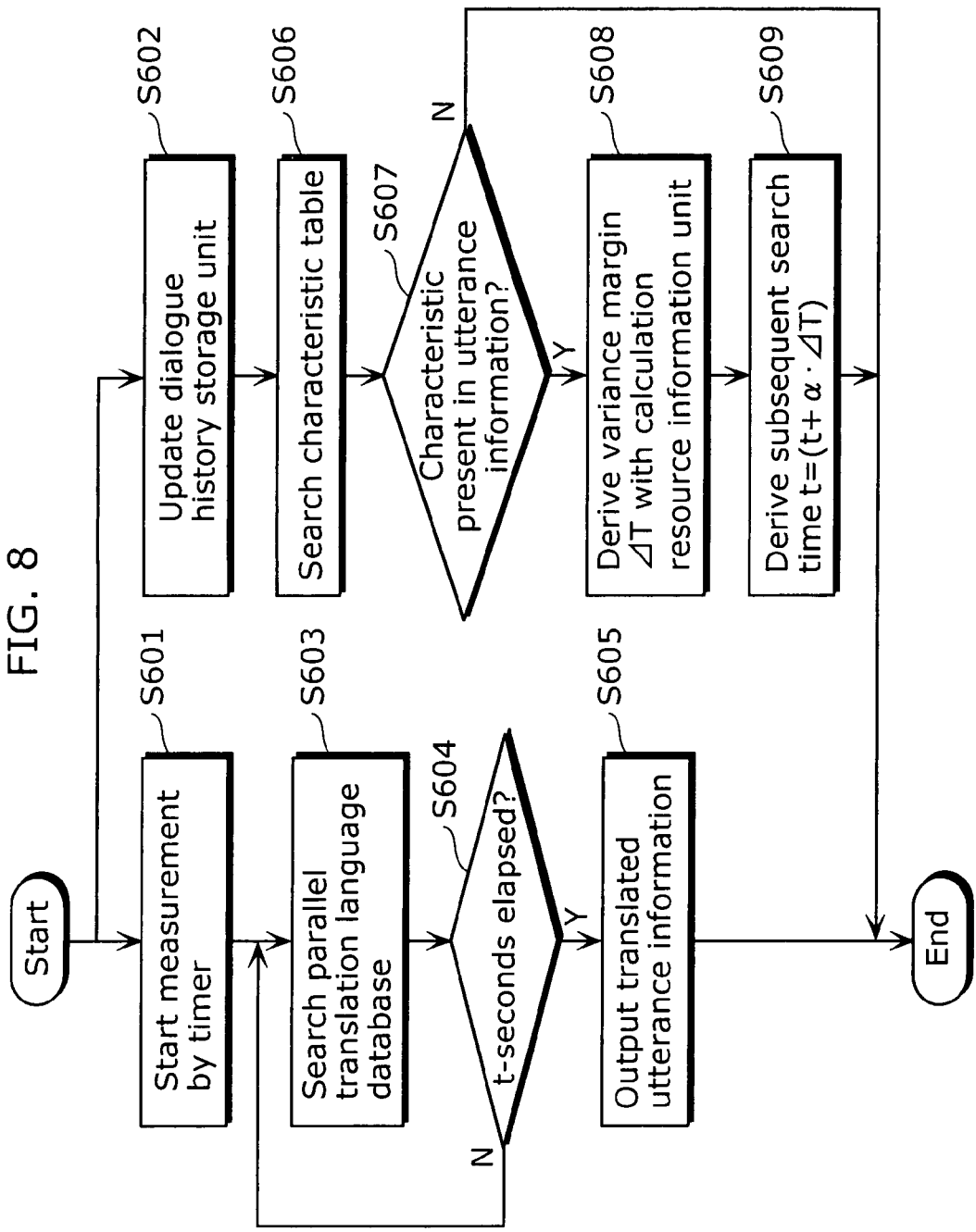
FIG. 8 is a flowchart showing an example of more detailed operation of the dialogue supporting apparatus in the case where step S403 shown in FIG. 6 is performed in parallel (First Embodiment)

FIG. 8 is a flowchart showing, in more detail, an example of the operation of the dialogue supporting apparatus in the case where parallel processing is carried out in step S403 in FIG. 6. First, when the utterance from the user 1 or the user 2 is accepted by the first input accepting unit 101 or the second input accepting unit 104 and the translation start button 306 or the translation start button 312 is pressed, the first translation processing unit 102 or the second translation processing unit 105 starts-up its internal timer, and starts to measure the output time t set by the output time determination unit 107

(S601). Then, the first translation processing unit 102 or the second translation processing unit 105 searches the parallel translation language database until the output time t set by the output time determination unit 107 elapses (S603 to S604). In the case where the output time of t seconds elapses in step S604, the search for the parallel translation corpus is discontinued at that point, and the translated utterance information obtained at that point is outputted (S605).

In parallel with the processes in the aforementioned steps S601, S603, S604, and S605, the first input accepting unit 101 or the second input accepting unit 104, the dialogue history analysis unit 202, the calculation resource information unit 203 and the time calculation unit 204 perform the following processes. In other words, the first input accepting unit 101 or the second input accepting unit 104 generates first utterance information or second utterance information corresponding to the inputted utterance, and updates the dialogue history storage unit 201 with the generated first utterance information or second utterance information (S602). In other words, when the input start button 303 or the input start button 309 is pressed and an utterance is inputted, the first input accepting unit 101 or the second input accepting unit 104 generates first utterance information or second utterance information, and updates the dialogue history storage unit 201 with the generated first utterance information or second utterance information, regardless of the operation of the first translation processing unit 102 or the second translation processing unit 105. Next, the dialogue history analysis unit 202, refers to the characteristics table 205 (S606), and analyzes whether or not a characteristic described in the characteristics table 205 is included in the utterance information stored in the updated dialogue history storage unit 201 (S607). In the case where a characteristic described in the characteristics table 205 is present in the utterance information, the dialogue history analysis unit 202 obtains, from the characteristics table 205, a coefficient $\alpha$ corresponding to the characteristic, and outputs the coefficient to the time calculation unit 204. Furthermore, the time calculation unit 204 refers to the table in the calculation resource information unit 203 and derives a variance margin $\Delta T$ (S608) In addition, the time calculation unit 204 derives, from the obtained coefficient $\alpha$ and variance margin $\Delta T$, an output time $t=(t+\alpha \cdot \Delta T)$ which is equivalent to the upper limit for the parallel translation language database search time for the subsequent utterance information, and sets a new output time t for the subsequent translation process, then the process ends (S609). Furthermore, in the case where a characteristic described in the characteristics table 205 is not included in the utterance information in step S607, the time calculation unit 204 does not do anything and the process ends. Alternatively, it is also possible that, as an equivalent process, the time calculation unit 204 may assume a coefficient $\alpha=0$, and set a new output time t for the subsequent translation process, then the process ends. In such manner, by performing parallel processing, the output time t calculated by the time calculation unit 204 can be used, without waste, for searching the parallel translation language database, from the start of the measurement by the timer until the output time t elapses. Furthermore, by performing parallel processing, the calculation for the output time t for the subsequent utterance can be finished while the search of the parallel translation language database is being carried out and, thus, the translation processes can be started promptly even when the user 1 and the user 2 carry out continuous utterances.

FIG. 9 shows the configuration of the calculation resource information unit 203. FIG. 9 is a diagram showing an example of the data configuration of the table held by the calculation resource information unit 203 shown in FIG. 3. With regard to each parameter in FIG. 9, T is the initial value of the output time t, $\Delta T$ is the variance margin for the output time t, and min T is the minimum value for the output time t. The reference value row indicates the values when the present apparatus is equipped with a calculation device having a CPU performance of 600 million instructions per second (MIPS), and it is necessary to perform calculations in accordance with the performance of the calculation device which is actually installed. In the example in FIG. 9, since the CPU performance at this point is 1200 MIPS, all the parameters are set at a factor of 600/1200 times, in other words, 0.5 times. Note that since CPU performance varies from moment to moment depending on the relationship between the number of processes currently being processed and their priorities as well as the amount of usable main memory, the time required for the translation process can be accurately set by calculation which is inversely proportional to the average load (a value from 0 to 100) of the current CPU. For example, even when CPU performance of the present apparatus is 1200 MIPS, when the load is at 50%, the values for T and $\Delta T$ are appropriately set with the CPU performance as 600 MIPS, by multiplying a value (1-load/100) to the original CPU performance.

FIG. 10 is a diagram showing an example of the data configuration of the characteristics table held by the dialogue history analysis unit shown in FIG. 3. Next, FIG. 10 shows the data configuration of the characteristics table 205 which is referred to by the dialogue history analysis unit 202. Here, as types of characteristics, classification is carried out into three types, namely, a mutual understanding, a continuity of surface expressions, and a change of topic.

(1) In the case where the characteristic included in the utterance of the speaker falls under mutual understanding, there is a mutual understanding with the dialogue-partner, and thus, it is assumed that even when the translated utterance information for the subsequent utterance by the dialogue-partner is slightly vague, the speaker should be able to understand.

(2) Next, continuity of surface expressions refers to a property which indicates, when there is an utterance of certain surface expressions, whether or not there is a tendency that a part of such surface expressions will likely be included in the subsequent utterance. Moreover, in this case, extraction from the characteristics table is especially carried out in the case where the part of such surface expressions bears a significant meaning within the subsequent utterance. It is assumed that, for the speaker, when a part of the surface expressions which he uses is included, with significant meaning, within the utterance of the dialogue-partner, the speaker should be able to understand the translated utterance information even when it is not so fluent. Conversely, in the case where there is a high possibility that a part of the surface expressions will not be included within the subsequent utterance and such surface expression bears significant meaning, it is preferable to have more appropriate and fluent translated utterance information for the utterance of the dialogue-partner.

(3) In addition, in the case where the characteristic included in the speaker's utterance falls under a change of topic, it is assumed that since there is a high possibility that a different utterance which has no relation to the dialogue up to that point will be made, translated utterance information having the same level of fluency as in the start of a new conversation is required. Note that, although exemplification is carried out here regarding the three types, namely, a mutual understanding, a continuity of surface expressions, and a change of topic as types of characteristics, the characteristics table 205 can also be created to have types of characteristics that are different from those mentioned, or having more types of characteristics. With respect to the aforementioned types of characteristics, the characteristics table 205 is mainly made up of the set of the three items, namely, language 1 characteristic, language 2 characteristic, and coefficient α. The coefficient α is determined by analyzing a dialogue performed experimentally via the translation process. In other words, in the case where the intention is communicated to the partner even though an utterance B following an utterance A has a rough translation, a negative value is derived for the coefficient α of the characteristic of utterance A; and, in the case where the intention cannot be communicated to the partner without an accurate translation, a positive value is derived for the coefficient α of the characteristic of utterance A. Although a more appropriate output time can be determined by changing the absolute value of the coefficient α in accordance with the roughness or accuracy of the translation process, description is carried out here using a ±1 value in order to simplify explanation. The dialogue history analysis unit 202 detects the characteristic within the characteristic table 205, from within the dialogue history stored in the dialogue history storage unit 201, and outputs a coefficient α which is in accordance with such characteristic. However, in the case where the coefficient α is "reset", this means that the time calculation unit 204 returns the output time t to the initial time T. Furthermore, when a characteristic cannot be found, output is made with α=0.

The time calculation unit 204 obtains the value of each parameter from the calculation resource information unit 203, and the dialogue history analysis unit 202 obtains the coefficient α and calculates the output time t. The calculation of t is carried out by increasing or decreasing the current t value by a value proportionate to ΔT in the direction of the coefficient α. For example, as the simplest calculation, calculation is carried out as t←t+αΔT. However, when output time t becomes t<min T, it is assumed that t←min T.

Hereinafter, the specific operation in the case of supporting inter-lingual dialogue shall be described in detail. It is assumed that the native language of the user 1 is Japanese and the native language of the user 2 is English.

FIG. 11 is a table showing an example of the contents of the dialogue history storage unit shown in FIG. 3 and initial values of the upper limit of the search time derived by the time calculation unit 204 in accordance with the contents. In FIG. 11, to make the operation of the present invention easier to comprehend, the contents of the dialogue history storage unit 201 which is updated according to the utterance (first utterance information or second utterance information) of the user is described in 701, the translation (first translated utterance information or second translated utterance information) and the likelihood outputted through the processing of the same utterance by the first translation processing unit 102 or the second translation processing unit 105 is described in 702, and the result of the calculation for the output time t by the time calculation unit 204 is described in 703. Immediately after the use of the present apparatus is started, the time calculation unit 204 refers to the contents of the calculation resource information unit 203 and sets the output time t to T in step S401. The status of the present apparatus moves to that in step S402.

Figure 12:
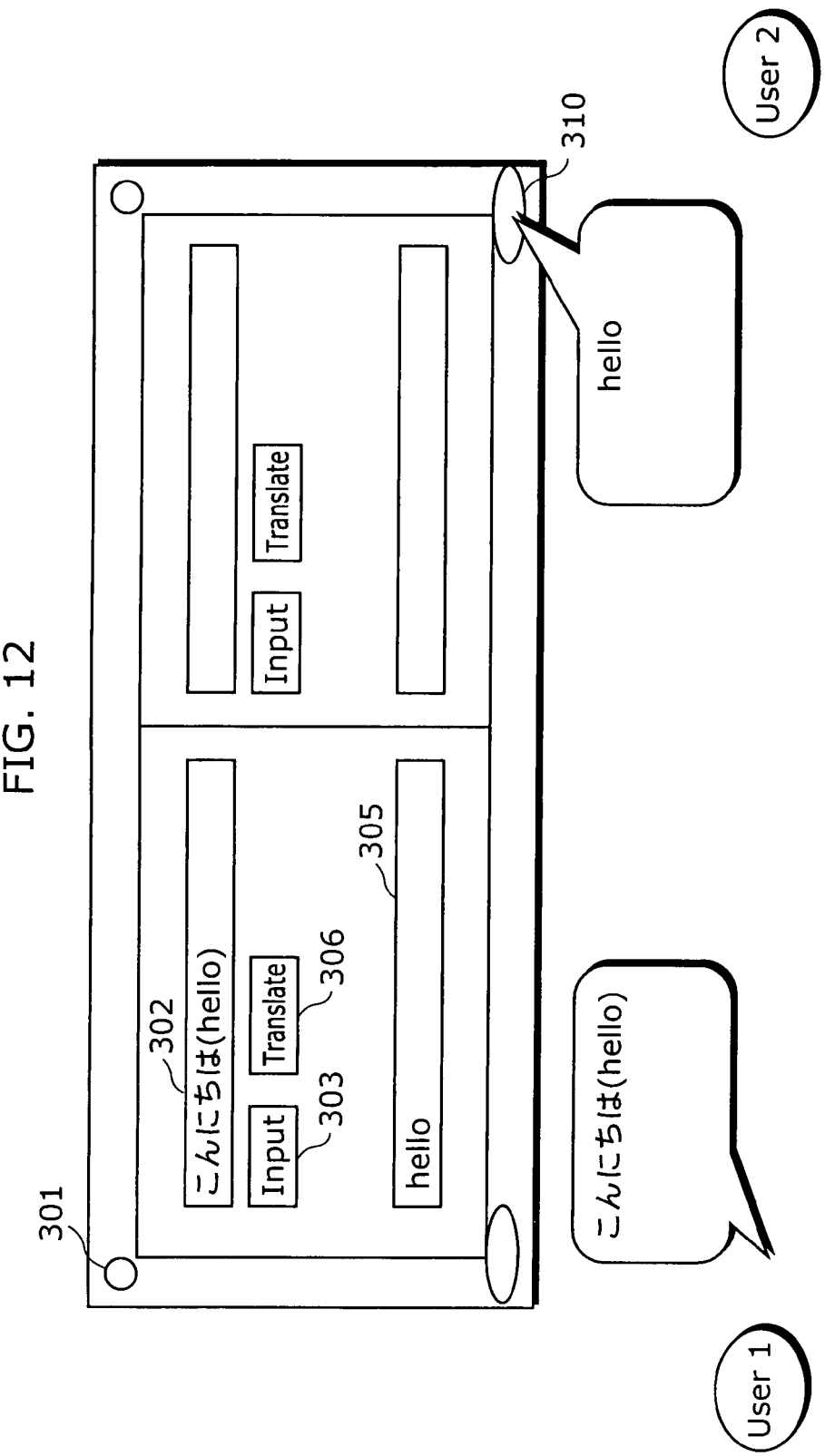
FIG. 12 is a diagram showing an example of the output and the display of translated utterance information of the dialogue supporting apparatus when the user 1 makes an initial utterance (First Embodiment)

FIG. 12 is a diagram showing an example of the output and the display of translated utterance information of the dialogue supporting apparatus when the user 1 makes an initial utterance. In the dialogue supporting apparatus in FIG. 12, the user 1 presses the input start button 303 and utters " こんにちは (hello)". Passing through the microphone 301, the first input accepting unit 101 outputs "こんにちは (hello)" as first utterance information. When the user 1 presses the translation start button 306, the process moves to step S403, and the first translation processing unit 102 starts the translation process, spending the maximum t time. FIG. 13 is a diagram showing an example of the contents of the dialogue history storage unit which is updated with respect to the utterance by the user 1 shown in FIG. 12, and the upper limit t, for the subsequent search time, derived by the time calculation unit in accordance with the contents. As shown in 902 in FIG. 13, the first translation processing unit 102 outputs "hello" and the likelihood 1.0 as first translated utterance information. In the case where the threshold value of the first output unit 103 is U1=0.6, the likelihood is higher than U1, and thus, the first translated utterance information "hello" is displayed, as is, on the translated utterance information 305, and "hello" is reproduced from the speaker 310, through a speech synthesizing process. Simultaneous with the start of the translation process, the dialogue history storage unit 201 is updated as in 901 shown in FIG. 13, and the dialogue history analysis unit 202 analyzes the characteristic of the dialogue history's content 901. However, since there is no characteristic, the dialogue history analysis unit 202 outputs a coefficient α=0. Since the output time t which is calculated by the time calculation unit 204 does not change, t remains at t=T as shown in 903. The process returns to step S402.

FIG. 14 is a diagram showing an example of the output and the display of translated utterance information of the dialogue supporting apparatus when the user 2 makes an utterance in response to the utterance by the user 1. As shown in FIG. 14, it is assumed that, hearing the translated utterance of the user 1, the user 2 presses the input start button 309 and utters "Which do you like, tea or coffee?". Passing through the microphone 313, the second input accepting unit 104 outputs "which do you like tea or coffee" as second utterance information. When the user 2 presses the translation start button 312, the process moves to step S403, and the second translation processing unit 105 starts the translation process, spending the maximum t time. As shown in 1102, the second translation processing unit 105 outputs " お茶とコーヒーどちらが好きですか (which would you like, tea or coffee?)" and a likelihood 0.9 as second translated utterance information. In the case where the second output unit 106 has a threshold value U2=0.6, since the likelihood is higher than U2, the second translated utterance information " お茶とコーヒーどちらが好きですか (which would you like, tea or coffee?)" is displayed, as is, on the translated utterance information 311, and " お茶とコーヒーどちらが好きですか (which would you like, tea or coffee?)" is reproduced from the speaker 304, through a speech synthesizing process. FIG. 15 is a diagram showing an example of the contents of the dialogue history storage unit which is again updated with respect to the utterance by the user 2 shown in FIG. 14, and the upper limit t, for the subsequent search time, derived by the time calculation unit in accordance with the contents. At the same time, the dialogue history storage unit 201 is updated as in 1101 shown in FIG. 15, and the dialogue history analysis unit 202 analyzes the characteristic of the dialogue history 1101. For the utterance information "which do you like tea or coffee?" of the user 2, (continuity of surface expressions, 1) among the characteristics in FIG. 10 is applicable. Accordingly, a coefficient α=−1 is outputted. The time calculation unit 204 sets the output time t to t+αΔT=T−ΔT. The process moves to step S402.

Figure 16:
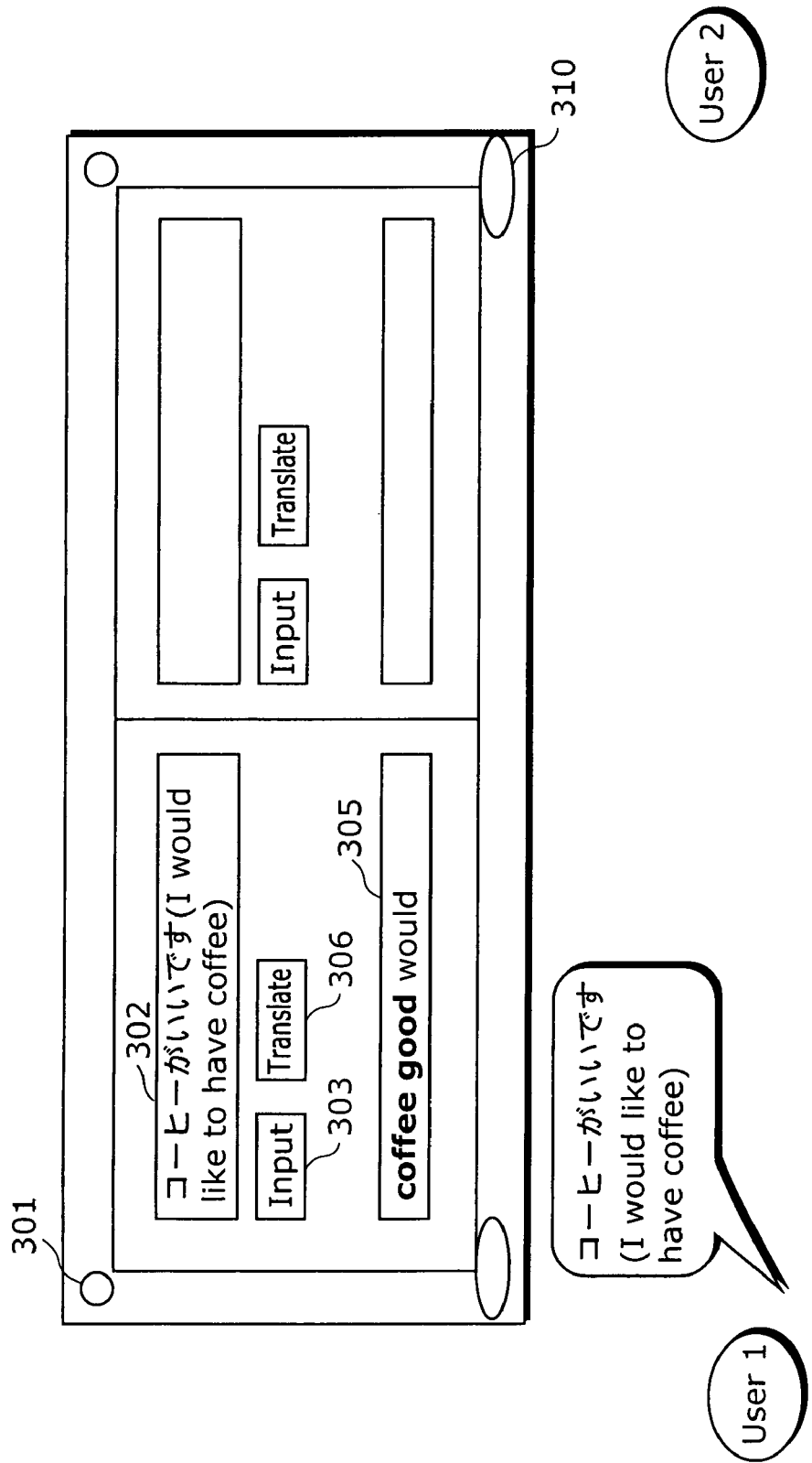
FIG. 16 is a diagram showing an example of the output and the display of the translated utterance information of the dialogue supporting apparatus when the user 1 makes an utterance in response to the utterance by the user 2 (First Embodiment)

FIG. 16 is a diagram showing an example of the output and the display of the translated utterance information of the dialogue supporting apparatus when the user 1 makes an utterance in response to the utterance by the user 2. FIG. 17 is a diagram showing an example of the contents of the dialogue history storage unit which is again updated with respect to the utterance by the user 1 shown in FIG. 16, and the upper limit t, for the subsequent search time, derived by the time calculation unit in accordance with the contents. FIG. 16 shows an example for the case where the user 1, hearing the translated utterance of the user 2, presses the input start button 303 and utters "コーヒーがいいです (I would like to have coffee)". Passing through the microphone 301, the first input accepting unit 101 outputs "コーヒーがいいです (I would like to have coffee)" as first utterance information. When the user 1 presses the translation start button 306, the process moves to step S403, and the first translation processing unit 102 starts the translation process, spending a maximum t=T−ΔT of time. As shown in 902, the first translation processing unit 102 outputs "coffee good would" and the likelihood 0.5 as first translated utterance information. Since the first output unit 103 has the threshold value U1=0.6, the likelihood is lower than U1. The first translated utterance information "coffee good would" is displayed on the translated utterance information 305 with the independent words "coffee" and "good" being highlighted. However, the speech synthesizing process is not carried out, and nothing is reproduced from the speaker 310. Simultaneous with the start of the translation process, the dialogue history storage unit 201 is updated as in 1301 shown in FIG. 17, and the dialogue history analysis unit 202 analyzes the characteristic of the dialogue history's content 1301. However, since there is no characteristic, the dialogue history analysis unit 202 outputs a coefficient α=0. Since the output time t which is calculated by the time calculation unit 204 does not change, t remains at t=T−ΔT as shown in 1303. The process moves to step S402.

The effect of the present invention appears as follows. In other words, describing with the use of the specific numerical values of each parameter in FIG. 9, although the initial utterance by the user 1 and the 2nd utterance by the user 2 were processed in 25 seconds, the 3rd utterance by the user 1 was processed in 15 seconds. Accordingly, although it is unclear whether or not a correct translation can be acquired even when 25 seconds is spent, since a translation which is sufficient enough to continue the dialogue can be acquired by spending 15 seconds, it is possible for the user 1 and the user 2 to complete their dialogue promptly. Furthermore, even though the translation is sufficient for continuing a dialogue, since the fluency and accuracy of meaning are insufficient, there are instances where reading it out through speech synthesizing can confuse the partner. With the present invention, in the case where the fluency and accuracy of meaning are insufficient according to the likelihood of the translation, the dialogue can be continued swiftly while avoiding confusing the partner by stopping the speech synthesizing process, and highlighting the independent words within the display of the translation.

FIG. 18 is a diagram comparing the effect produced by the dialogue supporting apparatus in the present invention and a dialogue supporting apparatus of the conventional method in terms of dialogue history and search time upper limit. Here, the effect of the present inventions shall be further verified quantitatively. FIG. 18 shows a dialogue 1401 of the conventional method which uses the automatic translation function, as is, for dialogue support, and a dialogue 1402 supported by the present invention. In the dialogue in the conventional method, the upper limit for the time spent for each translation process is constant, and thus a time of 8T is required for 8 utterances. With the respective parameters in FIG. 9, 3 minutes and 20 seconds are required for the translation processes for this 8-utterance dialogue. Note that the user 1 is unable to convey his intentions to the user 2. However, in the dialogue supported by the present invention, since the upper limit of the time for the translation process is changed in accordance with the context of the dialogue, only a time of (8T−2ΔT) is required for an identical 8 utterances. In other words, the user 1 and the user 2 have a mutual understanding in 3 minutes. Accordingly, in the real world in which dialogues must be completed promptly, the effect of the present invention is useful. Note that in the example shown in FIG. 18A, although the dialogue time is shortened by 2ΔT compared to the conventional example shown in 18B, it is not always the case that the dialogue time is shortened with the dialogue supporting apparatus in the present invention, and a dialogue time which is about the same as with the conventional dialogue supporting apparatus is also possible. However, with the dialogue supporting apparatus in the present invention, the parallel translation language data base is not searched with the same amount of time every time, and more time is spent for searching only in the case where an utterance characteristic requiring more accuracy and fluency is found. With this, a translation result which is more suitable to the flow of the dialogue can be acquired and, as a result, there is the effect that, even when the same amount of time is spent on the dialogue, the probability for achieving communication with the dialogue partner is increased.

The effect of the present invention shall be verified from a different viewpoint. FIG. 19 is a graph showing a comparison between the average translation processing time for the dialogue supporting apparatus in the present invention and the average translation processing time with the conventional method. In FIG. 18, the conventional method and the present invention are compared in terms of dialogue history and search time upper limit. This is plotted, from the viewpoint of average translation time, from dialogue start to dialogue end in the diagram shown in FIG. 19. The average translation processing time for a time t is the average value of the translation processing time resulting from the total translation processing time spent up to the time t divided by the number of utterances up to the time t. Since the translation processing time in the conventional method is constant, the average translation processing time is also a constant value. However, in the present invention, with the increase in the accumulated amount of dialogue history as the dialogue progresses, the average value for the translation processing time decreases. As such, when the dialogues are completed with the level of communication being at the same level, there is the effect in which the time required for dialogue for the present invention is shorter than that for the conventional method.

Figure 20:
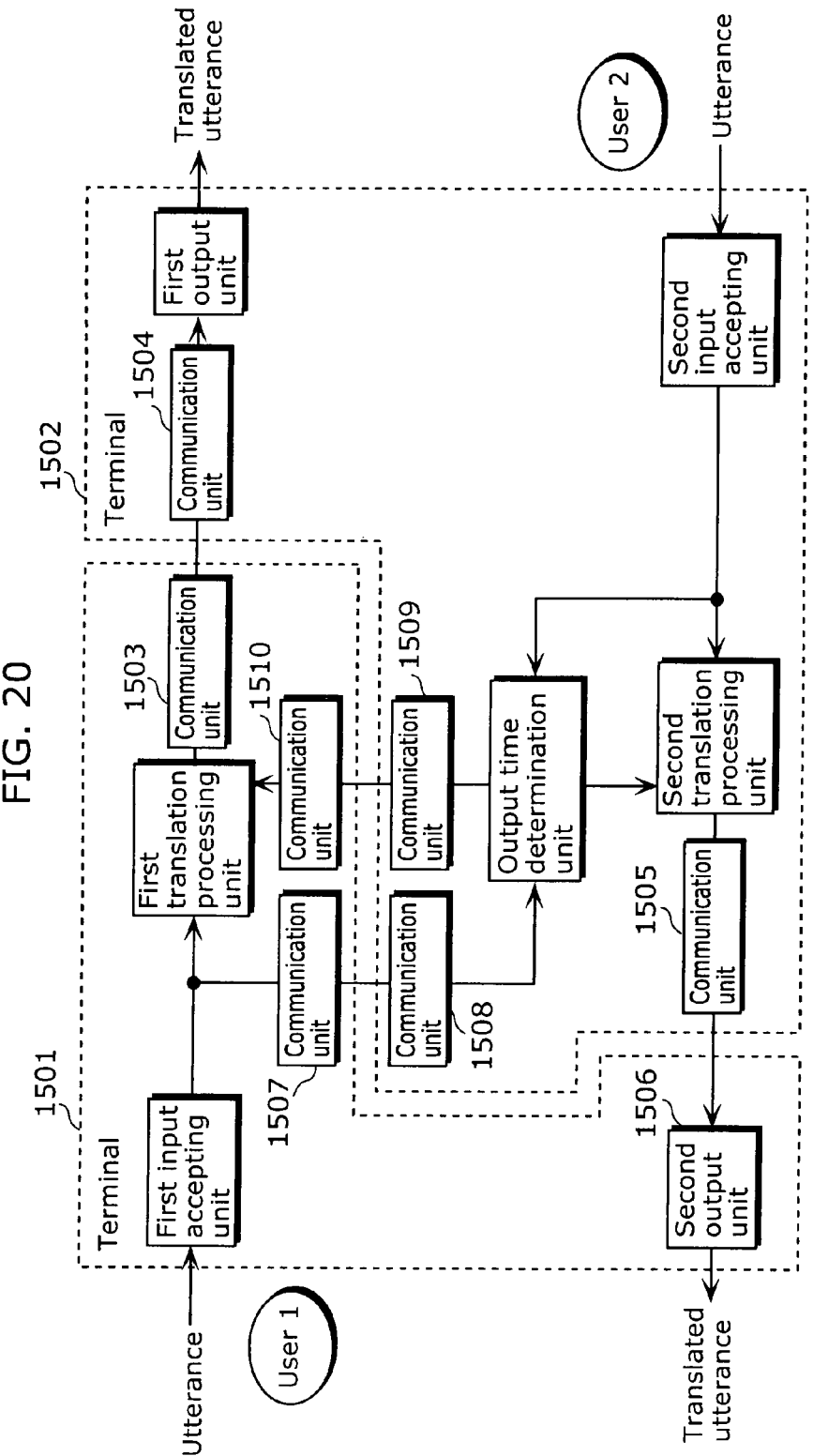
FIG. 20 is a block diagram showing the configuration of a variation of the dialogue supporting apparatus in the present invention (First Embodiment)
Figure 21:
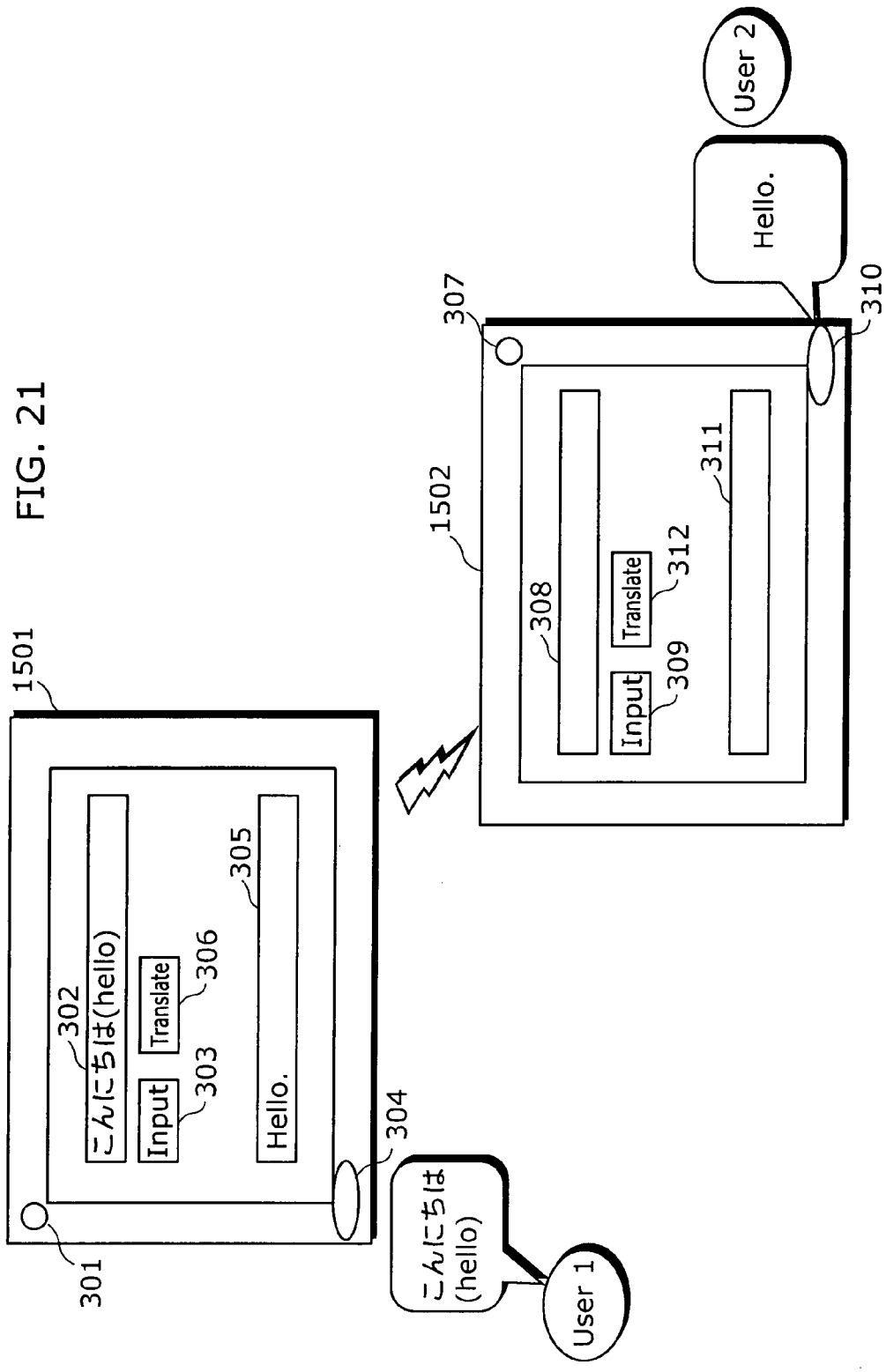
FIG. 21 is a diagram showing the user interface in the variation of the dialogue supporting apparatus of the present invention (First Embodiment)

FIG. 20 is a block diagram showing the configuration of a variation of the dialogue supporting apparatus in the present invention. FIG. 21 is a diagram showing the user interface in the variation of the dialogue supporting apparatus of the present invention. Note that although and example of the user interface for the present invention is shown in FIG. 5, an implementation as that in the user interfaces shown in FIG. 21 is also possible by adding communication units 1503 to 1510 to the configuration shown in FIG. 2 as shown in FIG. 20, and dividing the configuration in FIG. 2 into a terminal 1501 and a terminal 1502. By adopting such a configuration, the process of determining the output time in the terminal 1501 of the user 1 can be omitted. In other words, in the terminal 1501 of the user 1, it is sufficient to carry out the translation process by the first translation processing unit 102 according to the output time received from the terminal 1502 of the user 2. To be specific, as shown in FIG. 21, the terminal 1501 of the user 1 receives the output time, in advance, from the terminal 1502 of the user 2. Then, when the user 1 presses the input start button 303, inputs "こんにちは (hello)" and subsequently presses the translation start button 306, the first translation processing unit 102 performs the translation the utterance information "こんにちは (hello)" of the user 1 to English until the output time received from the terminal 1502. In the terminal 1501, the translated utterance information, which is the translation result of the first translation processing unit 102, and the likelihood are transmitted from the communication unit 1503 to the communication unit 1504 of the terminal 1502. In the terminal 1502, the translated utterance information "Hello." is reproduced and outputted through the speaker 310. In the terminal 1502, the utterance information of the utterance " こんにちは (hello)" inputted in the terminal 1501 is received via the communication unit 1507 and the communication unit 1508, and the received utterance information " こんにちは (hello)" is analyzed, and the translated utterance information output time for the next utterance is derived. Note that although an output time determination unit is not included in the terminal 1501 here, the present invention is not limited to such, and it is also possible for the terminal 1501 to have the same configuration as the terminal 1502 which includes an output time determination unit.

Figure 22:
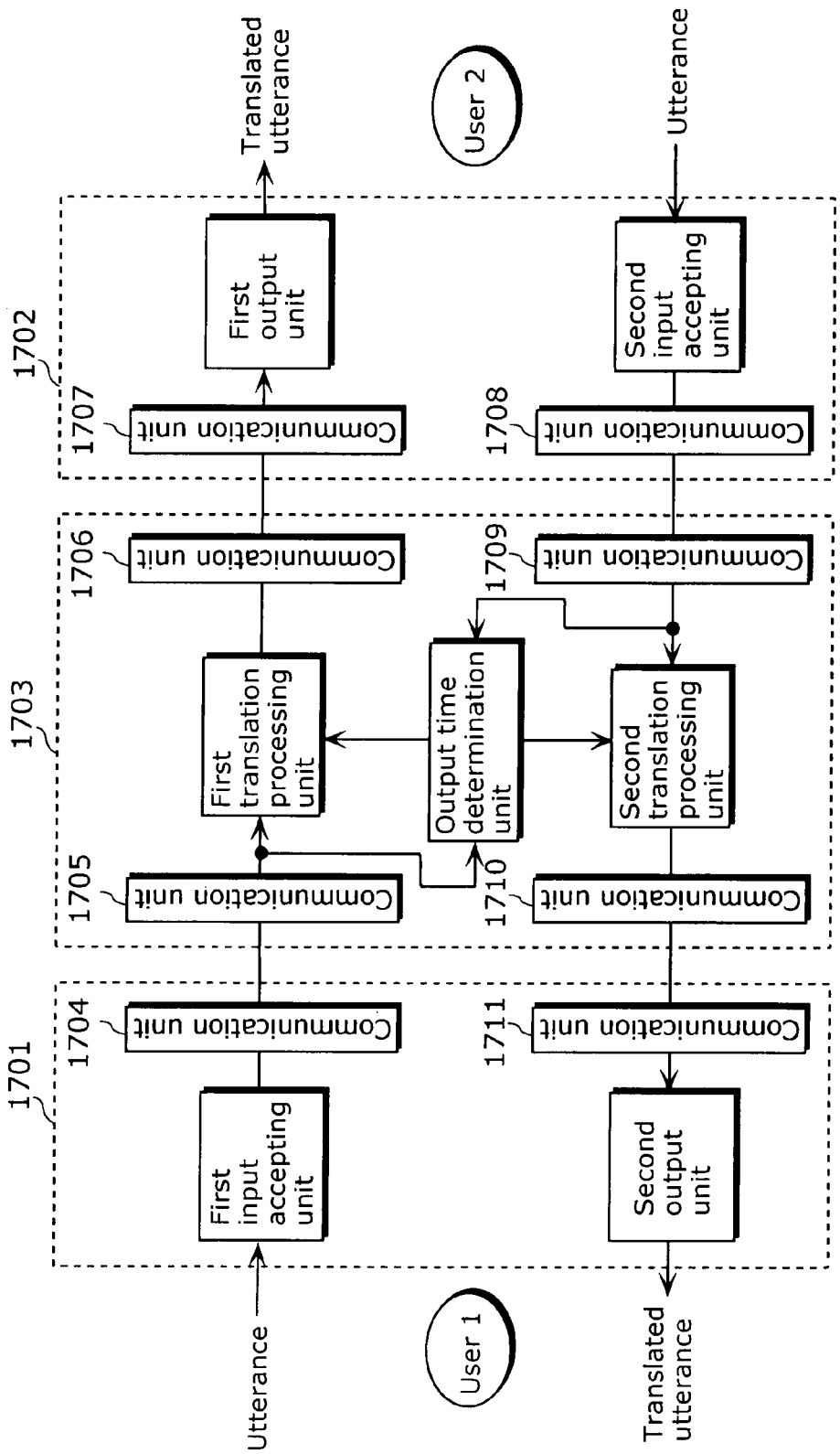
FIG. 22 is a block diagram showing the configuration of a second variation of the dialogue supporting apparatus in the present invention (First Embodiment)

FIG. 22 is a block diagram showing the configuration of a second variation of the dialogue supporting apparatus in the present invention. Furthermore, as shown in FIG. 22, by adding communication units 1704 to 1711 to the configuration in FIG. 2, it is also possible to equip the first translation processing unit 102 and the second translation processing unit 105, and the output time determination unit 107 into a server 1703, and provide a terminal 1701 and a terminal 1702 so as to be connected to the server 1703 via respective communication lines. By adopting such a configuration, it is possible to simplify the configuration of the terminal 1701 and the terminal 1702, and realize miniaturization, lightening and power-saving for the terminal 1701 and the terminal 1702.

Note that by expanding the range of the utterance information to be referenced up to the immediately preceding n utterances when the dialogue history analysis unit 202 searches for a characteristic within the contents of the dialogue history storage unit 201, more exact controlling of translation processing time becomes possible. For example, by accumulating coefficient α only for those utterances in the immediately preceding 6 utterances where the mutual understanding characteristics in the characteristics table 205 in FIG. 10 are found, the level of mutual understanding between the user 1 and the user 2 are more accurately derived, and by calculating the value of the output time t accordingly, an even more sufficient translation processing time upper limit can be determined.

Note that by normalizing the values of each parameter held by the calculation resource information unit 203 by the number of words of the inputted utterance information, more exact controlling of translation processing time becomes possible. For example, in the above-mentioned example, the values for T and ΔT are calculated according to the average number of words W of the utterance information. However, when the number of words of the inputted utterance information is W/2, an even more sufficient translation processing time upper limit can be determined, by setting t/2, which normalizes the already calculated value of t to ½, as the upper limit for the translation processing time, immediately before the start of the translation process. Alternatively, when the number of words of the inputted utterance information is 2W, an even more sufficient translation processing time upper limit can be determined, by setting 2t, which normalizes the already calculated value of t twofold, as the upper limit for the translation processing time, immediately before the start of the translation process. Note that in such a case the graph in FIG. 19, which shows the effect of the present invention, should be interpreted by plotting after returning the value of t to the pre-normalization time.

Moreover, although the upper limit for the translation processing time in the aforementioned embodiment is limited to the time t, the same effect is realized even when the upper limit for the translation processing time is indirectly limited using another parameter which is proportional with the time t. For example, since a depth d for the depth of the search for a translation in the statistical translation process and the translation processing time are in a proportional relationship, the same effect is achieved by setting an average search depth D and a variance margin ΔD for a depth of a search equivalent to ΔT, and executing the aforementioned process as is with T and D being interchanged in terms of reference symbols. It goes without saying that, aside from the depth of the search, the same effect can be achieved by substituting a parameter that stipulates the amount of translation processing such as the number of search steps, and the extent of the search range.

Note that although Japanese and English are used as an example, the present invention can likewise be implemented even with other languages such as French, German, Korean or Chinese. The present invention is not dependent on the language.

Second Embodiment

In the aforementioned first embodiment, detailed description is carried out regarding specific operations in the case where inter-language conversation is supported using the present invention, in which the native language of the user 1 is Japanese and the native language of the user 2 is English. In the following second embodiment, description is carried out regarding an example of a dialogue supporting apparatus which supports the dialogue of both a user 1 having Chinese as a native language and a user 2 having English as a native language. With regard to the configuration of the dialogue supporting apparatus in the second embodiment, since the processing details of the respective processing units are the same as those shown in FIG. 2, with only the languages to be processed by the respective processing units being different, illustration shall be omitted. The following are the points of difference between the dialogue supporting apparatus in the first embodiment and the dialogue supporting apparatus.

The first input accepting unit 101 accepts the utterance of the user 1 (first user) in a first language (Chinese), and outputs first utterance information depicting the utterance of the user 1 as a character string. The first translation processing unit 102 translates the first utterance information into a second language (English) used by the user 2 (second user), and outputs first translated utterance information and the likelihood of the first translated utterance information.

Figure 23:
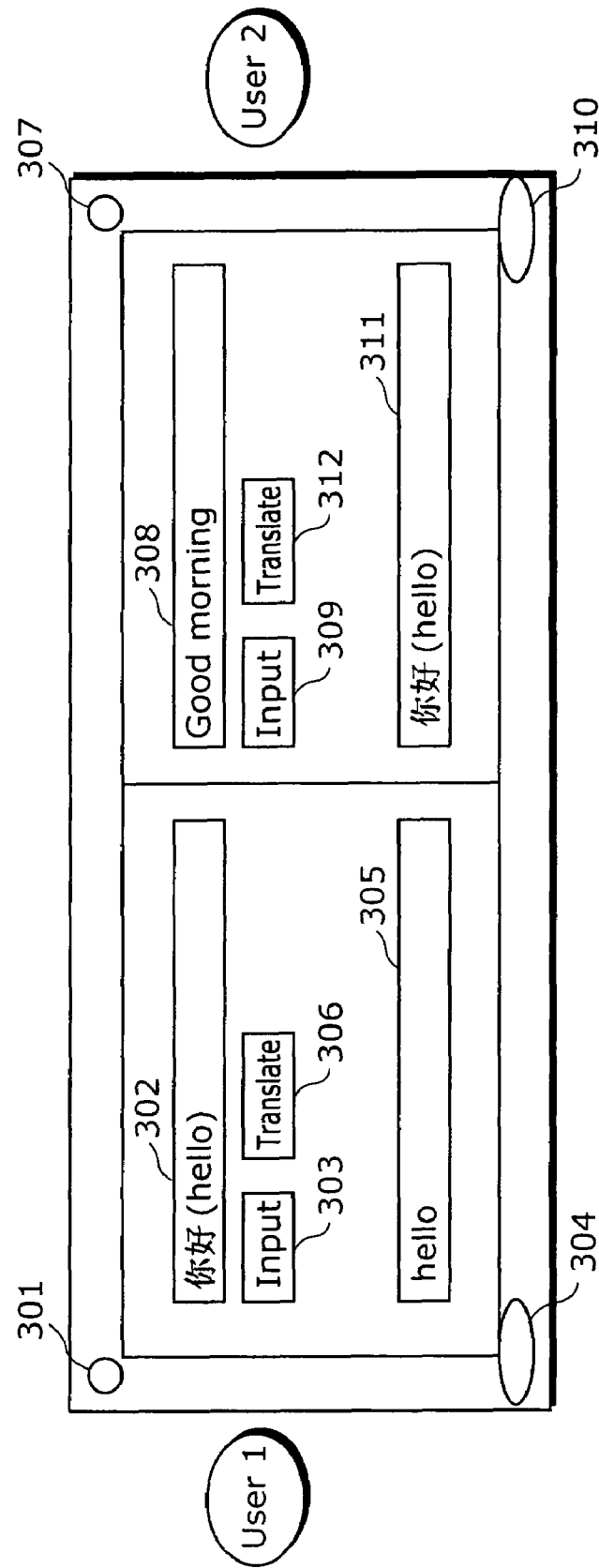
FIG. 23 is a diagram showing the user interface of the dialogue supporting apparatus in the second embodiment (Second Embodiment)

FIG. 23 is a diagram showing the user interface of the dialogue supporting apparatus in the second embodiment. FIG. 23 shows a hardware user interface equipped with the present invention. The right-side user interface is used by the Chinese-speaking user 1, and the left-side user interface is used by the English-speaking user 2. The microphone 301, the input utterance information 302, and the input start button 303 correspond to the first input accepting unit 101; and the speaker 304, and the translated utterance information 311 correspond to the second output unit 106. The translation start button 306 is a button for starting the translation process by the first translation processing unit 102. Likewise, the microphone 307, the input utterance information 308, and the input start button 309 correspond to the second input accepting unit 104; and the speaker 310, and the translated utterance information 305 correspond to the first output unit 103. The translation start button 312 is a button for starting the translation process by the second translation processing unit 105.

FIG. 24 is a diagram showing an example of the data configuration of the characteristics table in the case where language 1 is Chinese and language 2 is English. With FIG. 10, description is carried out regarding the data configuration of the characteristics table in the case where the native-language of the user 1 is a language 1 (Japanese), and the native language of the user 2 is a language 2 (English). However, FIG. 24 is different from FIG. 10 in that the native language of the user 1 is the language 1 (Chinese).

FIG. 25 is a diagram showing an example of the output and the display of translated utterance information of the dialogue supporting apparatus when the user 1 makes an initial utterance. The user 1 presses the input start button 303, and utters "你好 (hello)" into the dialogue supporting apparatus shown in FIG. 25. Passing through the microphone 301, the first input accepting unit 101 outputs "你好 (hello)" as first utterance information. When the user 1 presses the translation start button 306, the first translation processing unit 102 starts the translation process, spending the maximum t time. FIG. 26 is a diagram showing an example of the contents of the dialogue history storage unit which is updated with respect to the utterance by the user 1 shown in FIG. 25, and the upper limit t, for the subsequent search time, derived by the time calculation unit in accordance with the contents. As shown in 902 in FIG. 26, the first translation processing unit 102 outputs "hello" and the likelihood 1.0 as first translated utterance information. In the case where the threshold value of the first output unit 103 is U1=0.6, the likelihood is higher than U1 and thus, the first translated utterance information "hello" is displayed, as is, on the translated utterance information 305, and "hello" is reproduced from the speaker 310, through a speech synthesizing process. Simultaneous with the start of the translation process, the dialogue history storage unit 201 is updated as in 901 shown in FIG. 26, and the dialogue history analysis unit 202 analyzes the characteristic of the dialogue history's content 901. However, since there is no characteristic, the dialogue history analysis unit 202 outputs a coefficient α=0. Since the output time t which is calculated by the time calculation unit 204 does not change, t remains at t=T as shown in 903.

Figure 27:
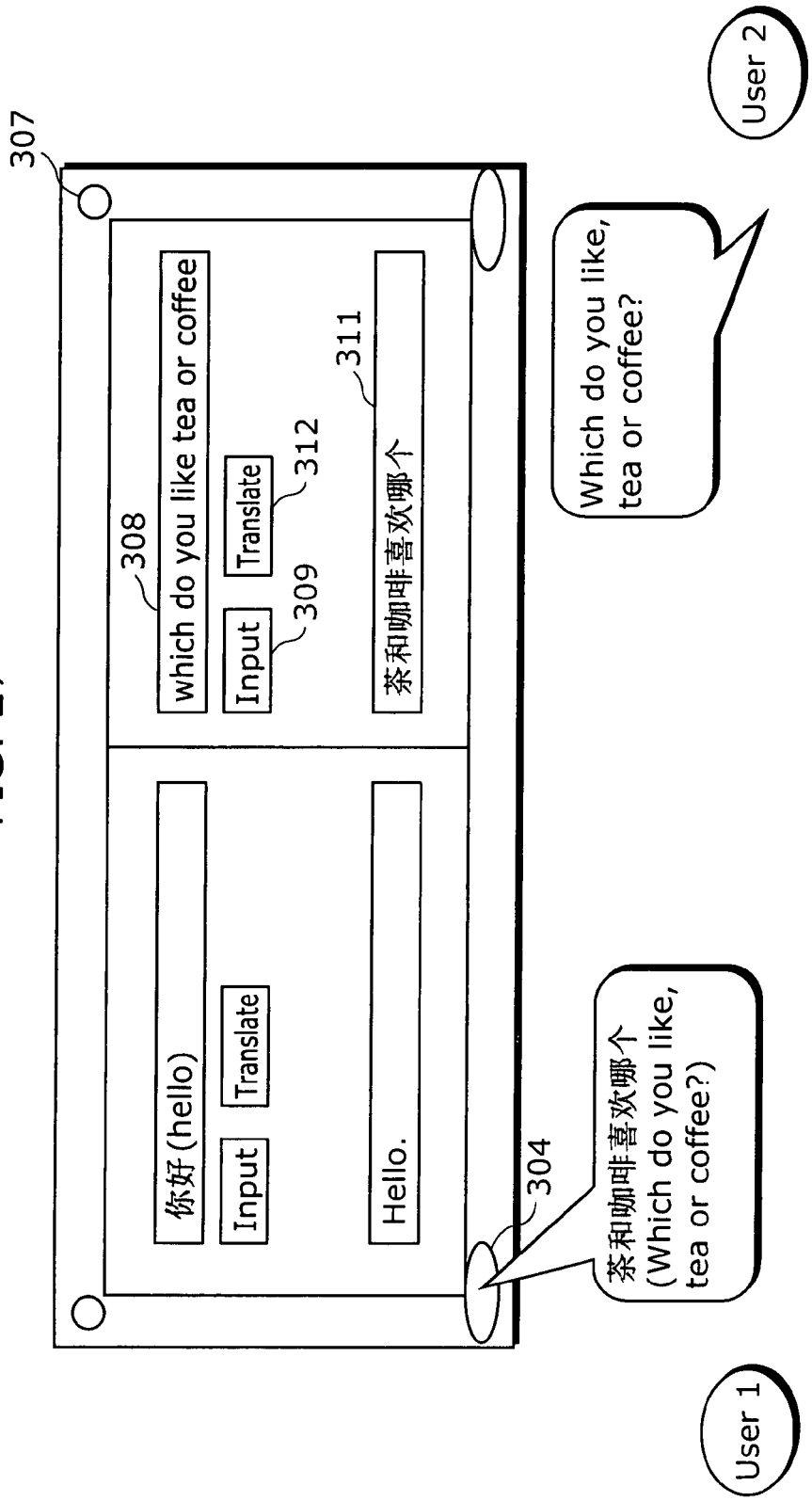
FIG. 27 is a diagram showing an example of the output and the display of translated utterance information of the dialogue supporting apparatus when the user 2 makes an utterance in response to the utterance by the user 1 (Second Embodiment)
Figure 28:
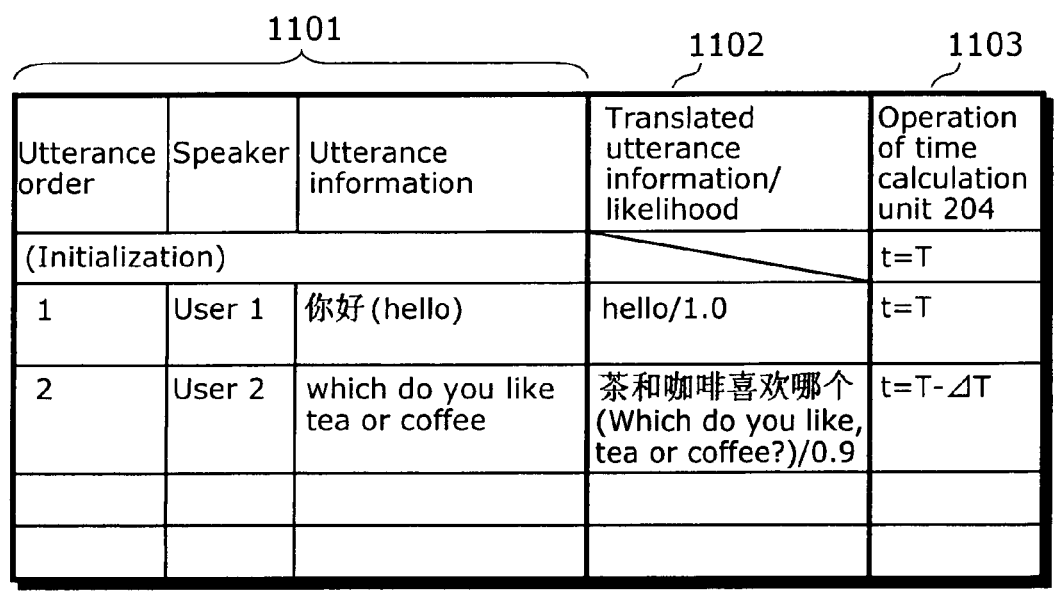
FIG. 28 is a diagram showing an example of the contents of the dialogue history storage unit which is again updated with respect to the utterance by the user 2 shown in FIG. 27, and the upper limit t, for the subsequent search time, derived by the time calculation unit in accordance with the content (Second Embodiment)

FIG. 27 is a diagram showing an example of the output and the display of translated utterance information of the dialogue supporting apparatus when the user 2 makes an utterance in response to the utterance by the user 1. As shown in FIG. 27, it is assumed that, hearing the translated utterance of the user 1, the user 2 presses the input start button 309 and utters "Which do you like, tea or coffee?". Passing through the microphone 313, the second input accepting unit 104 outputs "which do you like tea or coffee" as second utterance information. When the user 2 presses the translation start button 312, the second translation processing unit 105 starts the translation process, spending the maximum t time. As shown in 1102, the second translation processing unit 105 outputs "啡喜欢哪个" and the likelihood 0.9 as second translated utterance information. In the case where the threshold value of the second output unit 106 is U2=0.6, the likelihood is higher than U2, and thus, the second translated utterance information "茶和咖啡喜欢哪个" is displayed, as is, on the translated utterance information 311. In addition "喜欢哪个" is reproduced from the speaker 304, through a speech synthesizing process. FIG. 28 is a diagram showing an example of the contents of the dialogue history storage unit which is again updated with respect to the utterance by the user 2 shown in FIG. 27, and the upper limit t, for the subsequent search time, derived by the time calculation unit in accordance with the content. At the same time, the dialogue history storage unit 201 is updated as in 1101 shown in FIG. 28, and the dialogue history analysis unit 202 analyzes the characteristic of the dialogue history 1101. For the utterance information "which do you like tea or coffee?" of the user 2, (continuity of surface expressions, 1) among the characteristics in FIG. 24 is applicable. Accordingly, a coefficient α=−1 is outputted. The time calculation unit 204 sets the output time t to t+αΔT=T−ΔT.

FIG. 29 is a diagram showing an example of the output and the display of the translated utterance information of the dialogue supporting apparatus when the user 1 makes an utterance in response to the utterance by the user 2 shown in FIG. 27. FIG. 30 is a diagram showing an example of the contents of the dialogue history storage unit which is again updated with respect to the utterance by the user 1 shown in FIG. 29, and the upper limit t, for the subsequent search time, derived by the time calculation unit in accordance with the contents. FIG. 29 shows an example for the case where the user 1, hearing the translated utterance of the user 2, presses the input start button 303 and utters "喜欢咖啡 (I would like to have coffee)". Passing through the microphone 301, the first input accepting unit 101 outputs "喜欢咖啡 (I would like to have coffee)" as first utterance information. When the user 1 presses the translation start button 306, the first translation processing unit 102 starts the translation process, spending the maximum t=T−ΔT of time. As shown in 902, the first translation processing unit 102 outputs "coffee good would" and the likelihood 0.5 as first translated utterance information. Since the first output unit 103 has the threshold value U1=0.6, the likelihood is lower than U1. As such, the first translated utterance information "coffee good would" is displayed on the translated utterance information 305 with the independent words "coffee" and "good" being highlighted. However, the speech synthesizing process is not carried out, and nothing is reproduced from the speaker 310. Simultaneous with the start of the translation process, the dialogue history storage unit 201 is updated as in 1301 shown in FIG. 30, and the dialogue history analysis unit 202 analyzes the characteristic of the dialogue history's content 1301. However, since there is no characteristic, the dialogue history analysis unit 202 outputs a coefficient α=0. Since the output time t which is calculated by the time calculation unit 204 does not change, t remains at t=T−ΔT as shown in 1303.

The effect of the present invention appears as follows. In other words, as in the first embodiment, by describing with the use of the specific numerical values of each parameter in FIG. 9, the initial utterance by the user 1 and the 2nd utterance by the user 2 were processed in 25 seconds, but the 3rd utterance by the user 1 was processed in 15 seconds. Accordingly, although it is unclear whether or not a correct translation can be acquired even when 25 seconds is spent for the 3rd utterance by the user 1, since a translation which is sufficient enough to continue the dialogue can be acquired by spending 15 seconds, it is possible for the user 1 and the user 2 to complete their dialogue promptly. Furthermore, even though the translation is sufficient for continuing a dialogue, since the fluency and accuracy of meaning are not adequate, there are instances where reading it out through speech synthesizing can confuse the partner. With the present invention, in the case where the fluency and accuracy of meaning are insufficient according to the likelihood of the translation, the dialogue can be continued swiftly while avoiding confusing the partner by stopping the speech synthesizing process, and highlighting the independent words within the display of the translation.

Here, the effect of the present invention shall be further verified quantitatively. FIG. 31 is a diagram comparing the effect produced by the dialogue supporting apparatus in the present invention and a dialogue supporting apparatus of the conventional method in terms of dialogue history and search time upper limit. FIG. 31 shows a dialogue 1401 of the conventional method which uses the automatic translation function, as is, for dialogue support, and a dialogue 1402 supported by the present invention. In the dialogue in the conventional method, the upper limit for the time spent for each translation process is constant, and thus a time of 8T is required for 8 utterances. With the respective parameters in FIG. 9, 3 minutes and 20 seconds are required for the translation processes for this 8-utterance dialogue. Note that the user 1 is unable to convey his intentions to the user 2. However, in the dialogue supported by the present invention, since the upper limit of the time for the translation process is changed in accordance with the context of the dialogue, only a time of (8T−2ΔT) is required for an identical 8 utterances. In other words, the user 1 and the user 2 have a mutual understanding in 3 minutes. Accordingly, in the real-life situations in which dialogues must be completed promptly, the effect of the present invention is significant. Note that in the example shown in FIG. 31A, although the dialogue time is shortened by 2ΔT compared to the conventional example shown in 31B, it is not always the case that the dialogue time is shortened with the dialogue supporting apparatus in the present invention, and a dialogue time which is about the same as with the conventional dialogue supporting apparatus is also possible. However, with the dialogue supporting apparatus in the present invention, the parallel translation language data base is not searched with the same amount of time every time, and more time is spent for searching only in the case where an utterance characteristic requiring more accuracy and fluency is found. With this, a translation result which is more suitable to the flow of the dialogue can be acquired and, as a result, there is the effect that, even when the same amount of time is spent on the dialogue, the probability for achieving communication with the dialogue partner is increased.

The effect of the present invention shall be verified from a different viewpoint. In FIG. 31, the conventional method and the present invention are compared in terms of dialogue history and search time upper limit. This is plotted, from the viewpoint of average translation time, from dialogue start to dialogue end in the diagram shown in FIG. 19. The average translation processing time for a time t is the average value of the translation processing time resulting from the total translation processing time spent up to the time t divided by the number of utterances up to the time t. Since the translation processing time in the conventional method is constant, the average translation processing time is also a constant value. However, in the present invention, with the increase in the accumulated amount of dialogue history as the dialogue progresses, the average value for the translation processing time decreases. As such, when the dialogues are completed with the level of communication being at the same level, there is the effect in which the time required for dialogue for the present invention is shorter than that for the conventional method.

FIG. 32 is a block diagram showing the configuration of a variation of the dialogue supporting apparatus in the present invention. Note that, even in the second embodiment, an implementation as that in the user interfaces shown in FIG. 32 is also possible by adding communication units 1503 to 1510 to the configuration shown in FIG. 2 and dividing the configuration in FIG. 2 into a terminal 1501 and a terminal 1502. The specific internal configuration of these interfaces is the same as the configuration shown in FIG. 21.

Figure 33:
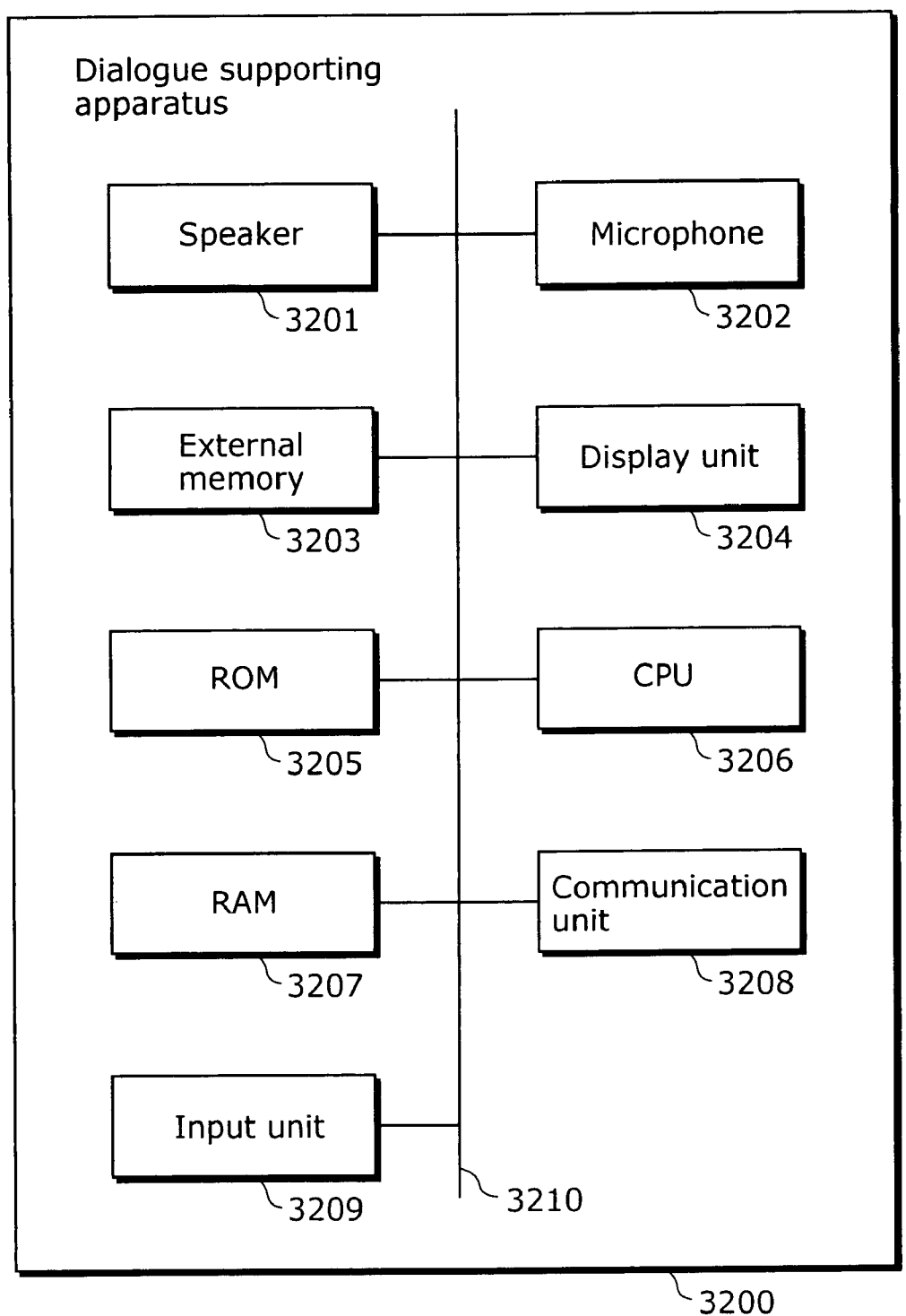
FIG. 33 is a block diagram showing an example of the hardware configuration of the dialogue supporting apparatus in the present invention (First Embodiment), (Second Embodiment).

FIG. 33 is a block diagram showing an example of the hardware configuration of the dialogue supporting apparatus in the present invention. As shown in the diagram, a dialogue supporting apparatus 3200 in the present invention includes a speaker 3201, a microphone 3202, an external memory 3203, a display unit 3204, a ROM 3205, a CPU (processor) 3206, a RAM 3207, a communication unit 3208, an input unit 3209 and a bus 3210.

The speaker 3201 is an implementation of the first output unit 103 and the second output unit 106, and outputs a translated utterance through synthesized speech. The microphone 3202 is an implementation of a part of the first input accepting unit 101 and the second input accepting unit 104, and accepts the speech input of the user 1 and the user 2. The external memory 3203 is a high-capacity memory such as a DVD and an IC card, and is an implementation of the parallel translation language database in which grammar, a parallel translation corpus, and so on are stored. Furthermore, a program, or the like, which is loaded into the RAM 3207 and executed after the start-up of the dialogue supporting apparatus 3200 is stored in the external memory 3203. The display unit 3204 is a liquid crystal display or the like, on which first utterance information and second utterance information is displayed. The ROM 3205 is a non-volatile, read-only semiconductor memory on which a start-up program for the dialogue supporting apparatus 3200 is stored. The CPU 3206 realizes the respective processing units within the dialogue supporting apparatus shown in the block diagrams in FIG. 2, FIG. 3, FIG. 4, FIG. 20, and FIG. 22, by executing programs stored in the ROM 3205 and the RAM 3207. The RAM 3207 is a volatile read-write memory which provides a working area by supplying a loaded program to the CPU 3206 and holding data being processed by the CPU 3206, after the start-up of the dialogue supporting apparatus 3200. The communication unit 3208, which is an implementation of the communication units 1503 to 1510 and the communication units 1704 to 1711 shown in FIG. 20 and FIG. 22 respectively, carries out the transmission and reception of data through infra-red communication and close-range wireless communication. The input unit 3209 is an operating button such as the input start buttons 303 and 309, and the translation start buttons 306 and 312, and accepts the operating input of a user. The bus 3210 is a parallel data transfer channel within the dialogue supporting apparatus 3200, and carries out data transfer among the respective processing units.

Note that the respective function blocks in the block diagrams (FIG. 2 to FIG. 4, FIG. 20 and FIG. 22 and so on) are typically implemented as LSI which is an integrated circuit. They may also be implemented separately as single chips, or as a single chip including a part or all of the function blocks.

For example the function blocks, other than the memory, may also be implemented as a single chip.

Although referred to here as the LSI, designations such as an IC, a system LSI, a super LSI, and an ultra LSI are also possible, depending on the level of integration.

Furthermore, the method of circuit integration is not limited to an LSI, and implementation through a dedicated circuit or a general-purpose processor is also possible. It is also possible to use a Field Programmable Gate Array (FPGA) which allows programming after manufacturing of the LSI, and a reconfigurable processor which allows reconfiguration of the connections and settings of circuit cells within the LSI.

Moreover, should circuit integration technology replacing the LSI appear with the progress of semiconductor technology or the offshoot of other technology, naturally, integration of the function blocks may be carried out using such technology. There is also the possibility for the application of biotechnology, and so on.

Furthermore, it is also possible to that, among the respective function blocks, only the unit which stores data to be encrypted or decrypted is not integrated into a single chip, with it being implemented as a separate structure.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The dialogue supporting apparatus according to the present invention has the function for promptly completing the utterance of a dialogue participant, and is useful as translation application software for a mobile phone and a portable terminal, and so on. Furthermore, application for uses such as a street-side terminal and a guidance terminal for public use is also possible.

What is claimed is:

1. A dialogue supporting apparatus which supports a dialogue carried out in different languages, said dialogue supporting apparatus comprising:
an input accepting unit operable to accept an utterance of a user as an input;
a translation processing unit operable to translate the accepted utterance into a predetermined language, and to output translated utterance information which is acquired through the translation;
an output notification unit operable to notify the outputted translated utterance information to a user; and
an output time determination unit operable to: hold a characteristics table showing plural items of characteristic information and plural items of adjustment information in association with each other; analyze whether or not the characteristic information is included in the utterance of the user by referring to the characteristics table; and determine an output time for translation of an utterance which is to be accepted subsequently, each of the plural items of characteristic information being information representing a preset characteristic of an utterance, and each of the plural items of adjustment information being information for adjusting an output time for translation of an utterance which is a response to an utterance including the characteristic information, according to a characteristic of the utterance including the characteristic information.

2. The dialogue supporting apparatus according to claim 1, wherein said input accepting unit includes:
a first input accepting unit operable to accept, as an input, an utterance of a first user which is in a first language; and
a second input accepting unit operable to accept, as an input, an utterance of a second user which is in a second language,
said translation processing unit includes:
a first translation processing unit operable to translate the utterance of the first user into the second language, and to output first translated utterance information which is acquired through the translation; and
a second translation processing unit operable to translate the utterance of the second user into the first language, and to output second translated utterance information which is acquired through the translation,
said output notification unit includes:
a first output notification unit operable to notify the outputted first translated utterance information to the second user; and
a second output notification unit operable to notify the outputted second translated utterance information to the first user,
said output time determination unit is operable to analyze whether or not the characteristic information is included in the utterance of the first user or the utterance of the second user, and to determine an output time indicating an upper limit of a translation time for the translation, by said first translation Processing unit or said second translation processing unit, of an utterance to be accepted subsequent to the utterance of the first user or the utterance of the second user, and
said first translation processing unit or said second translation processing unit is operable to output the first translated utterance information or the second translated utterance information which is a translation result acquired by the output time.

3. The dialogue supporting apparatus according to claim 2, wherein said translation processing unit performs a translation process according to a statistical translation method.

4. The dialogue supporting apparatus according to claim 2, wherein said output time determination unit holds, in an order of utterance, a history of first utterance information and second utterance information, and is operable to determine the output time for first utterance information or second utterance information which is held subsequently, by referring to a characteristic of a prior first utterance information or second utterance information included in the history, the first utterance information depicting the utterance of the first user as a character string, and the second utterance information depicting the utterance of the second user as a character string.

5. The dialogue supporting apparatus according to claim 2, wherein a type of the characteristic, which is a basis for the determination of the output time by said output time determination unit, is a mutual understanding, and
the output time is determined so that the translation time is shortened in the case where, according to a result of the analysis, a characteristic indicating mutual understanding is included in the accepted utterance.

6. The dialogue supporting apparatus according to claim 2, wherein a type of the characteristic, which is a basis for the determination of the output time by said output time determination unit, is a continuity of surface expressions, and
the output time is determined so that the translation time is:
shortened in the case where, according to a result of the analysis, a characteristic indicating a continuity of surface expressions is included in the accepted utterance; and
lengthened in the case where, according to a result of the analysis, a characteristic indicating a non-continuity of surface expressions is included in the accepted utterance.

7. The dialogue supporting apparatus according to claim 2, wherein a type of the characteristic, which is a basis for the determination of the output time by said output time determination unit, is a change of topic, and
the output time is determined to be an initial value so that the translation time is of a standard length in the case where, according to a result of the analysis, a characteristic indicating a change of topic is included in the accepted utterance.

8. The dialogue supporting apparatus according to claim 2, further comprising a calculation resource information unit operable to provide information regarding a calculation resource of said dialogue supporting apparatus,
wherein said output time determination unit is operable to determine the output time of the first translated utterance information or the second translated utterance information by referring to the information regarding the calculation resource.

9. The dialogue supporting apparatus according to claim 2, wherein at least one of said first output notification unit and second output notification unit includes:
a speech synthesis unit operable to reproduce first translated utterance information and/or second translated utterance information through synthesized speech; and
a character image display unit operable to display first translated utterance information and/or second translated utterance information.

10. The dialogue supporting apparatus according to claim 9,
wherein said speech synthesis unit does not operate in the case where a likelihood of the first translated utterance information and/or the second translated utterance information is lower than a predetermined threshold value.

11. The dialogue supporting apparatus according to claim 9,
wherein said character image display unit is operable to display in highlighted manner only independent words included in the first translated utterance information and/or the second translated utterance information, in the case where a likelihood of the first translated utterance information and/or the second translated utterance information is lower than a predetermined threshold value.

12. A dialogue supporting system which supports a dialogue carried out in different languages through dialogue supporting apparatuses, for respective users, which carry out mutual communication via a communication network,
wherein a first dialogue supporting apparatus includes:
a first input accepting unit operable to accept, as an input, an utterance of a first user which is in a first language;
a first translation processing unit operable to translate the accepted utterance of the first user into a predetermined language, and to output first translated utterance information which is acquired through the translation;
a first transmission unit operable to transmit the outputted first translated utterance information to a second dialogue supporting apparatus;
a first output time determination unit operable to: hold a characteristics table showing plural items of characteristic information and plural items of adjustment information in association with each other; analyze whether or not the characteristic information is included in the utterance of a first user by referring to the characteristics table; and determine an output time indicating an upper limit of a translation time for translating an utterance to be accepted subsequent to the utterance of the first user, each of the plural items of characteristic information being information representing a preset characteristic of an utterance, and each of the plural items of adjustment information being information for adjusting an output time for translation of an utterance which is a response to an utterance including the characteristic information, according to a characteristic of the utterance including the characteristic information; and
a first output time transmission unit operable to transmit the determined output time to said second dialogue supporting apparatus, and
a second dialogue supporting apparatus includes:
a second receiving unit operable to receive the first translated utterance information from said first dialogue supporting apparatus, and to notify the first translated utterance information to a second user;
a second output time receiving unit operable to receive the output time determined by said first dialogue supporting apparatus, from said first dialogue supporting apparatus;
a second input accepting unit operable to accept, as an input, an utterance of the second user which is in the predetermined language;
a second translation processing unit operable to translate the accepted utterance of the second user into the first language, and to output second translated utterance information which is acquired through the translation; and
a second transmission unit operable to transmit the outputted second translated utterance information to said first dialogue supporting apparatus, and
said second translation processing unit is operable to output the second translated utterance information which is a translation result acquired by the received output time.

13. A dialogue supporting system which supports a dialogue carried out in different languages, using a first dialogue supporting apparatus and a second dialogue supporting apparatus which are connected to a server via a communication network,
wherein said first dialogue supporting apparatus includes:
a first input accepting unit operable to accept, as an input, an utterance of a first user which is spoken in a first language;
a first transmission unit operable to transmit the accepted utterance of the first user to said server;
a second receiving unit operable to receive, from said server, second translated utterance information which is a translation result of translating, into the first language, an utterance of a second user in response to the utterance of the first user; and
a first output notification unit operable to notify the received second translated utterance information to the first user, and
said second dialogue supporting apparatus includes:
a second input accepting unit operable to accept, as an input, an utterance of a second user which is spoken in a second language;
a second transmission unit operable to transmit the accepted utterance of the second user to said server;
a first receiving unit operable to receive, from said server, first translated utterance information which is a translation result of translating, into the second language, an utterance of the first user in response to the utterance of the second user; and
a second output notification unit operable to notify the received first translated utterance information to the second user, and
said server includes:
a first utterance receiving unit operable to receive the utterance of the first user from said first dialogue supporting apparatus;
a first translation processing unit operable to translate the received utterance of the first user into the second language, and to output first translated utterance information which is acquired through the translation;

a first transmission unit operable to transmit the outputted first translated utterance information to said second dialogue supporting apparatus;

a second utterance receiving unit operable to receive the utterance of the second user from said second dialogue supporting apparatus;

a second translation processing unit operable to translate the received utterance of the second user into the first language, and to output second translated utterance information which is acquired through the translation;

a second transmission unit operable to transmit the outputted second translated utterance information to said first dialogue supporting apparatus; and an output time determination unit operable to: hold a characteristics table showing plural items of characteristic information and plural items of adjustment information in association with each other; analyze whether or not the characteristic information is included in the utterance of the first user or the utterance of the second user that is received, by referring to the characteristics table; and determine an output time indicating an upper limit of a translation time for the translation, by said first translation processing unit or said second translation processing unit, of an utterance subsequent to the utterance of the first user or the utterance of the second user, each of the plural items of characteristic information being information representing a preset characteristic of an utterance, and each of the plural items of adjustment information being information for adjusting an output time for translation of an utterance which is a response to an utterance including the characteristic information, according to a characteristic of the utterance including the characteristic information, and said first translation processing unit or said second translation processing unit is operable to output the first translated utterance information or the second translated utterance information which is a translation result acquired by the determined output time.

14. A dialogue supporting method for supporting a dialogue carried out in different languages, said method comprising steps of:

accepting, as an input, an utterance of a user, said accepting being performed by an input unit;

translating the accepted utterance into a predetermined language, and outputting translated utterance information which is acquired through said translating, said translating and outputting being performed by a translation processing unit;

notifying the outputted translated utterance information to a user, said notifying being performed by an output notification unit; and holding characteristics table showing plural items of characteristic information and plural items of adjustment information in association with each other; analyzing whether or not the characteristic information is included in the utterance of the user by referring to the characteristics table; and determining a translation time for translating an utterance to be accepted subsequently, said holding, analyzing, and determining being performed by an output time determination unit, and each of the plural items of characteristic information being information representing a preset characteristic of an utterance, and each of the plural items of adjustment information being information for adjusting an output time for translation of an utterance which is a response to an utterance including the characteristic information, according to a characteristic of the utterance including the characteristic information.

15. A program embodied on a computer-readable memory unit for use in a dialogue supporting apparatus which supports a dialogue carried out in different languages, said program causing a computer to execute steps of:

accepting, as an input, an utterance of a user, said accepting being performed by an input unit;

translating the accepted utterance into a predetermined language, and outputting translated utterance information which is acquired through said translating, said translating and outputting being performed by a translation processing unit;

notifying the outputted translated utterance information to a user, said notifying being performed by an output notification unit; and holding a characteristics table showing plural items of characteristic information and plural items of adjustment information in association with each other; analyzing whether or not the characteristic information is included in the utterance of the user by referring to the characteristics table, and determining a translation time for translating an utterance to be accepted subsequently, said holding, analyzing, and determining being performed by an output time determination unit, and each of the plural items of characteristic information being information representing a preset characteristic of an utterance, and each of the plural items of adjustment information being information for adjusting an output time for translation of an utterance which is a response to an utterance including the characteristic information, according to a characteristic of the utterance including the characteristic information.

16. A dialogue supporting apparatus which supports a dialogue carried out in different languages, said dialogue supporting apparatus comprising:

an input accepting unit operable to accept, as an input, an utterance of a user; and a memory unit which stores a program including steps of (i) holding a characteristics table showing plural items of characteristic information and plural items of adjustment information in association with each other, translating the accepted utterance into a predetermined language, and outputting translated utterance information which is acquired through the translating, and (ii) analyzing whether or not the characteristic information is included in the utterance of the user by referring to the characteristics table, and determining a translation time for translation of an utterance which is to be accepted subsequently, each of the plural items of characteristic information being information representing a preset characteristic of an utterance, and each of the plural items of adjustment information being information for adjusting an output time for translation of an utterance which is a response to an utterance including the characteristic information, according to a characteristic of the utterance including the characteristic information;

a processor operable to execute the program stored in said memory unit; and an output notification unit operable to notify the translated utterance information outputted by said processor to a user.

* * * * *

UNITED STATES PATENT AND TRADEMARK OFFICE
CERTIFICATE OF CORRECTION

PATENT NO. : 7,505,893 B2
APPLICATION NO. : 11/785700
DATED : March 17, 2009
INVENTOR(S) : Kenji Mizutani et al.

It is certified that error appears in the above-identified patent and that said Letters Patent is hereby corrected as shown below:

On Title Page

Item (63), "PCT/JP2006/022129" should read --PCT/JP2006/322129--.

Signed and Sealed this

Twenty-seventh Day of October, 2009

David J. Kappos
*Director of the United States Patent and Trademark Office*